(12) United States Patent
Shim et al.

(10) Patent No.: US 7,252,617 B2
(45) Date of Patent: Aug. 7, 2007

(54) SIX-SPEED POWERTRAIN OF AN AUTOMATIC TRANSMISSION

(75) Inventors: Hyu Tae Shim, Hwaseong (KR); Ki Been Lim, Suwon (KR); Gyung Cheol Lee, Gunpo (KR); Byeong Ho Soh, Hwaseong (KR); Gang Soo Seo, Suwon (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 184 days.

(21) Appl. No.: 11/028,147

(22) Filed: Dec. 30, 2004

(65) Prior Publication Data

US 2006/0025275 A1 Feb. 2, 2006

(30) Foreign Application Priority Data

Jul. 28, 2004 (KR) ...................... 10-2004-0059261

(51) Int. Cl.
 *F16H 3/62* (2006.01)

(52) U.S. Cl. ...................................................... 475/275
(58) Field of Classification Search ................. 475/275
See application file for complete search history.

(56) References Cited

U.S. PATENT DOCUMENTS

| 6,176,802 | B1 * | 1/2001 | Kasuya et al. ............... 475/269 |
| 6,558,287 | B2 * | 5/2003 | Hayabuchi et al. ......... 475/271 |
| 6,935,985 | B2 * | 8/2005 | Ishimaru ...................... 475/296 |
| 2006/0135310 | A1 * | 6/2006 | Shim et al. ................... 475/282 |

* cited by examiner

*Primary Examiner*—Dirk Wright
(74) *Attorney, Agent, or Firm*—Morgan Lewis Bockius LLP

(57) ABSTRACT

A variable compound planetary gearset forms five operational elements by having its single and double pinion planetary gearsets be interconnected by a shared planet carrier. The variable compound planetary gearset forms six forward speeds and one reverse speeds by receiving input torque through two input routes fixedly or variably connected to a simple planetary gearset and one input route variably connected to an input shaft.

19 Claims, 26 Drawing Sheets

| Operational element | CLUTCH | | | BRAKE | | OWC | Shift ratio (exemplary value) |
|---|---|---|---|---|---|---|---|
| | C1 | C2 | C3 | B1 | B2 | | |
| 1st | ● | | | | ○ | ● | 4.044 |
| 2nd | ● | | | ● | | | 2.371 |
| 3rd | ● | | ● | | | | 1.556 |
| 4th | ● | ● | | | | | 1.159 |
| 5th | | ● | ● | | | | 0.852 |
| 6th | | ● | | ● | | | 0.672 |
| R | | | ● | | ● | | 3.193 |

4th

5th

6th

Reverse

|  | C1 | C2 | C3 | B1 | B2 | OWC | GEAR RATIO | STEP |
|---|---|---|---|---|---|---|---|---|
| P |  |  |  |  |  |  |  |  |
| REV |  |  | O |  | O |  | 3.389 |  |
| N |  |  |  |  |  |  |  |  |
| 1ST | O |  |  |  | (O) | O | 4.067 | )1.73 |
| 2ND | O |  |  | O |  |  | 2.354 | )1.51 |
| 3RD | O |  | O |  |  |  | 1.564 | )1.35 |
| 4TH | O | O |  |  |  |  | 1.161 | )1.35 |
| 5TH |  | O | O |  |  |  | 0.857 | )1.25 |
| 6TH |  | O |  | O |  |  | 0.684 |  |

# SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0059261 filed in the Korean Intellectual Property Office on Jul. 28, 2004, the entire content of which is incorporated herein by reference.

FIELD OF THE INVENTION

Generally, the present invention relates to an automatic transmission. More particularly, the present invention relates to a six-speed powertrain of an automatic transmission.

BACKGROUND OF THE INVENTION

A multi-stage gearshift mechanism of an automatic transmission includes a plurality of planetary gearsets. A powertrain having such a plurality of planetary gearsets varies the torque in multi-stages and outputs it to an output shaft when receiving a converted engine torque from a torque converter.

The more speeds the powertrain of an automatic transmission has, the better power performance and fuel consumption. Therefore, it is desirable to have as many speeds as possible in powertrains.

Even for the same number of speeds, durability, power transmission efficiency, and size/weight of a transmission are substantially dependent on how planetary gearsets are arranged. Therefore, research for more structural strength, less power loss, and more compact packaging are under continuing investigation.

Usually, development of a powertrain using planetary gearsets does not devise a wholly new type of planetary gearsets. To the contrary, it invokes how single/double pinion planetary gearsets are combined, and how clutches, brakes, and one-way clutches are disposed to the combination of planetary gearsets such that required shift speeds and speed ratios are realized with minimal power loss.

As for a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed.

An example of a conventional powertrain is shown in FIG. 26. The exemplary powertrain includes a combination of one single pinion simple planetary gearset SPG in the front and one Ravingneaux planetary gearset LPG of a Ravingneaux type in the rear. A first sun gear S1 of the single pinion simple planetary gearset SPG is fixed to a transmission case 1, and a second ring gear R2 (or equivalently, a third ring gear R3) of the Ravingneaux planetary gearset LPG is connected to an output gear OUT such that it acts as an output element.

In addition, a first ring gear R1 of the single pinion simple planetary gearset SPG is fixedly connected to an input shaft 3, and a third planet carrier PC3 interconnecting second and third planetary gears P2 and P3 of the Ravingneaux planetary gearset LPG is variably connected to the input shaft 3 interposing a second clutch C2.

In addition, a first planet carrier PC1 carrying first planetary gear P1 of the single pinion simple planetary gearset SPG is variably connected to a third sun gear S3 of the Ravingneaux planetary gearset LPG interposing a first clutch C1. In addition, the first planet carrier PC1 is variably connected to a second sun gear S2 interposing a third clutch C3.

The second sun gear S2 is connected to the transmission case 1 interposing a first brake B1. A third planet carrier PC3 carrying second and third planetary gears P2 and P3 of the Ravingneaux planetary gearset LPG is connected to the transmission case 1 interposing a second brake B2 and a one-way clutch OWC in parallel.

Such a powertrain is operated as shown in FIG. 27 to realize six forward speeds and one reverse speed. That is, the first clutch C1 and the one-way clutch OWC (or equivalently the second brake B2) operate in a first forward speed, the first clutch C1 and the first brake B1 operate in a second forward speed, the first clutch C1 and the third clutch C3 operate in a third speed, the first clutch C1 and the second clutch C2 operate in a fourth speed, the second and third clutches C2 and C3 operate in a fifth speed, the second clutch C2 and the first brake B1 operate in a sixth speed, and the third clutch C3 and the second brake B2 operate in a reverse speed.

According to such a powertrain, as shown in FIG. 28, three planetary gearsets are under a load for power transmission at one speed, i.e., at a second forward speed. At three speeds, i.e., at first, fourth, and fifth speeds, two planetary gearsets are under a load for power transmission. At two speeds, i.e., at third and sixth speeds, one planetary gearset is under a load for power transmission.

According to such a powertrain, idly rotating speed of the third sun gear S3 becomes excessively high at fifth and sixth forward speeds, and accordingly, durability of the powertrain becomes deteriorated.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention has been made in an effort to provide a six-speed powertrain of an automatic transmission having advantages of enhanced power transmission efficiency and durability.

An exemplary six-speed powertrain of an automatic transmission according to an embodiment of the present invention includes: a variable compound planetary gearset including a double pinion planetary gearset and a single pinion planetary gearset interconnected by a shared planet carrier so as to form first, second, third, fourth, and fifth operational elements; and a simple planetary gearset having sixth, seventh, and eighth operational element including an operational element fixedly and variably connected to two operational element of the variable compound planetary gearset, an input element fixedly connected to an input shaft, and a fixed element fixedly connected to a transmission case.

In a further embodiment: the first operational element is a sun gear of the double pinion planetary gearset of the variable compound planetary gearset; the second operational element is a ring gear of the double pinion planetary gearset of the variable compound planetary gearset; the third operational element is a ring gear of the single pinion planetary gearset of the variable compound planetary gearset; the fourth operational element is the shared planet carrier; the fifth operational element is a sun gear of the single pinion planetary gearset of the variable compound planetary gearset; the sixth operational element is a ring gear of the simple planetary gearset; the seventh operational element is a planet carrier of the simple planetary gearset; and the eighth operational element is a sun gear of the simple planetary gearset, wherein: the first operational element is fixedly connected to the seventh operational element; the second operational element is variably connected to the third operational element via a first clutch; the fourth operational element is variably connected to the sixth operational element via a second clutch; the fifth operational element is variably connected to the seventh operational element via a third clutch; the fifth operational element is variably connected to the transmission case via a first brake; the fourth operational element is variably connected to the transmission case via at least one of a second brake and a one-way clutch; the eighth operational element is fixedly connected to the transmission case; the third operational element always acts as an output element; and the sixth operational element always acts as an input element.

The simple planetary gearset may be realized as a single pinion planetary gearset.

Torque of the input shaft may be delivered to the variable compound planetary gearset through input routes comprising: a first input route wherein the torque of the input shaft is delivered to the first operational element at a reduced speed through the sixth operational element and the seventh operational element; a second input route wherein the torque of the input shaft is delivered to the fourth operational element at an equal speed; and a third input route wherein the torque of the input shaft is delivered to the fifth operational element at a reduced speed through the sixth operational element and seventh operational element.

The first input route may be activated at first, second, third, and fourth forward speeds by an operation of the first clutch variably connecting the second and third operational elements.

The second input route may be activated at fourth, fifth, and sixth forward speeds by an operation of the second clutch variably connecting the fourth and sixth operational elements.

The third input route may be activated at third and fifth forward speeds and a reverse speed by an operation of the third clutch variably connecting the fifth and seventh operational elements.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In another further embodiment: the first operational element is a sun gear of the double pinion planetary gearset of the variable compound planetary gearset; the second operational element is a ring gear of the double pinion planetary gearset of the variable compound planetary gearset; the third operational element is a ring gear of the single pinion planetary gearset of the variable compound planetary gearset; the fourth operational element is the shared planet carrier; the fifth operational element is a sun gear of the single pinion planetary gearset of the variable compound planetary gearset; the sixth operational element is a sun gear of the simple planetary gearset; the seventh operational element is a planet carrier of the simple planetary gearset; and the eighth operational element is a ring gear of the simple planetary gearset, wherein: the first operational element is fixedly connected to the seventh operational element; the second operational element is variably connected to the third operational element via a first clutch; the fourth operational element is variably connected to the sixth operational element via a second clutch; the fifth operational element is variably connected to the seventh operational element via a third clutch; the fifth operational element is variably connected to the transmission case via a first brake; the fourth operational element is variably connected to the transmission case via at least one of a second brake and a one-way clutch; the eighth operational element is fixedly connected to the transmission case; the third operational element always acts as an output element; and the sixth operational element always acts as an input element.

The simple planetary gearset may be realized as a single pinion planetary gearset.

Torque of the input shaft may be delivered to the variable compound planetary gearset through input routes comprising: a first input route wherein the torque of the input shaft is delivered to the first operational element at a reduced speed through the sixth operational element and the seventh operational element; a second input route wherein the torque of the input shaft is delivered to the fourth operational element at an equal speed; and a third input route wherein the torque of the input shaft is delivered to the fifth operational element at a reduced speed through the sixth operational element and seventh operational element.

The first input route may be activated at first, second, third, and fourth forward speeds by an operation of the first clutch variably connecting the second and third operational elements.

The second input route may be activated at fourth, fifth, and sixth forward speeds by an operation of the second clutch variably connecting the fourth and sixth operational elements.

The second input route may be activated at fourth, fifth, and sixth forward speeds by an operation of the second clutch variably connecting the fourth and sixth operational elements.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In a yet another further embodiment: the first operational element is a sun gear of the double pinion planetary gearset of the variable compound planetary gearset; the second operational element is a ring gear of the double pinion planetary gearset of the variable compound planetary gearset; the third operational element is a ring gear of the single pinion planetary gearset of the variable compound planetary gearset; the fourth operational element is the shared planet carrier; the fifth operational element is a sun gear of the single pinion planetary gearset of the variable compound planetary gearset; the sixth operational element is a planet carrier of the simple planetary gearset; the seventh operational element is a ring gear of the simple planetary gearset; and the eighth operational element is a sun gear of the simple planetary gearset, wherein: the first operational element is fixedly connected to the seventh operational element; the second operational element is variably connected to the third operational element via a first clutch; the fourth operational element is variably connected to the sixth operational element via a second clutch; the fifth operational element is variably connected to the seventh operational element via a third clutch; the fifth operational element is variably connected to the transmission case via a first brake; the fourth operational element is variably connected to the transmission case via at least one of a second brake and a one-way clutch; the eighth operational element is fixedly connected to the transmission case; the third operational element always acts as an output element; and the sixth operational element always acts as an input element.

The simple planetary gearset may be realized as a double pinion planetary gearset.

Torque of the input shaft may be delivered to the variable compound planetary gearset through input routes comprising: a first input route wherein the torque of the input shaft is delivered to the first operational element at a reduced speed through the sixth operational element and the seventh operational element; a second input route wherein the torque of the input shaft is delivered to the fourth operational element at an equal speed; and a third input route wherein the torque of the input shaft is delivered to the fifth operational element at a reduced speed through the sixth operational element and seventh operational element.

The first input route may be activated at first, second, third, and fourth forward speeds by an operation of the first clutch variably connecting the second and third operational elements.

The second input route may be activated at fourth, fifth, and sixth forward speeds by an operation of the second clutch variably connecting the fourth and sixth operational elements.

The third input route may be activated at third and fifth forward speeds and a reverse speed by an operation of the third clutch variably connecting the fifth and seventh operational elements.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In a yet another further embodiment: the first operational element is a sun gear of the double pinion planetary gearset of the variable compound planetary gearset; the second operational element is a ring gear of the double pinion planetary gearset of the variable compound planetary gearset; the third operational element is a ring gear of the single pinion planetary gearset of the variable compound planetary gearset; the fourth operational element is the shared planet carrier; the fifth operational element is a sun gear of the single pinion planetary gearset of the variable compound planetary gearset; the sixth operational element is a sun gear of the simple planetary gearset; the seventh operational element is a ring gear of the simple planetary gearset; and the eighth operational element is a planet carrier of the simple planetary gearset, wherein: the first operational element is fixedly connected to the seventh operational element; the second operational element is variably connected to the third operational element via a first clutch; the fourth operational element is variably connected to the sixth operational element via a second clutch; the fifth operational element is variably connected to the seventh operational element via a third clutch; the fifth operational element is variably connected to the transmission case via a first brake; the fourth operational element is variably connected to the transmission case via at least one of a second brake and a one-way clutch; the eighth operational element is fixedly connected to the transmission case; the third operational element always acts as an output element; and the sixth operational element always acts as an input element.

The simple planetary gearset may be realized as a double pinion planetary gearset.

Torque of the input shaft may be delivered to the variable compound planetary gearset through input routes comprising: a first input route wherein the torque of the input shaft is delivered to the first operational element at a reduced speed through the sixth operational element and the seventh operational element; a second input route wherein the torque of the input shaft is delivered to the fourth operational element at an equal speed; and a third input route wherein the torque of the input shaft is delivered to the fifth operational element at a reduced speed through the sixth operational element and seventh operational element.

The first input route may be activated at first, second, third, and fourth forward speeds by an operation of the first clutch variably connecting the second and third operational elements.

The second input route may be activated at fourth, fifth, and sixth forward speeds by an operation of the second clutch variably connecting the fourth and sixth operational elements.

The third input route may be activated at third and fifth forward speeds and a reverse speed by an operation of the third clutch variably connecting the fifth and seventh operational elements.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In a yet another further embodiment, the variable compound planetary gearset may include: a double pinion planetary gearset having a third sun gear, a pair of third planetary gears, and a third ring gear; a single pinion planetary gearset having a second sun gear disposed adjacent to the third sun gear, a second ring gear disposed adjacent to the third ring gear, and a second planetary gear connected to and rotatable independently from one of the third planetary gears; and at least one planet carrier interconnecting the second and third planetary gears.

Another exemplary six-speed powertrain of an automatic transmission according to an embodiment of the present invention includes: a variable compound planetary gearset including a single pinion planetary gearset and a double pinion planetary gearset interconnected by a shared planet carrier so as to form five operational elements, wherein the shared planet carrier is variably connected to a transmission case via at least one of a second brake and a one-way clutch and also variably connected to an input shaft via a second clutch, ring gears thereof are variably interconnected via a first clutch, one of the ring gears always acts as an output element, and a sun gear of the single pinion planetary gearset is variably connected to the transmission case; and a simple planetary gearset forming three operational elements including a planet carrier fixedly connected to one sun gear of the variable compound planetary gearset and variably connected to another sun gear thereof.

The simple planetary gearset may be realized as a single pinion planetary gearset.

In a further embodiment, torque of the input shaft is delivered to the variable compound planetary gearset through input routes comprising: a first input route wherein the torque of the input shaft is delivered to a sun gear of the double pinion planetary gearset of the variable compound planetary gearset at a reduced speed through a ring gear and the planet carrier of the simple planetary gearset; a second input route wherein the torque of the input shaft is delivered to the shared planet carrier at an equal speed; and a third input route wherein the torque of the input shaft is delivered to a sun gear of the single pinion planetary gearset of the variable compound planetary gearset at a reduced speed through a ring gear and the planet carrier of the simple planetary gearset.

The first input route may be activated at first, second, third, and fourth forward speeds by an operation of the first clutch variably connecting the ring gears of the variable compound planetary gearset.

The second input route may be activated at fourth, fifth, and sixth forward speeds by an operation of the second clutch variably connecting the shared planet carrier of the variable compound planetary gearset and the ring gear of the simple planetary gearset.

The third input route may be activated at third and fifth forward speeds and a reverse speed by an operation of a third clutch variably connecting the sun gear of the single pinion planetary gearset of the variable compound planetary gearset and the planet carrier of the simple planetary gearset.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In another further embodiment, torque of the input shaft is delivered to the variable compound planetary gearset through input routes comprising: a first input route wherein the torque of the input shaft is delivered to a sun gear of the double pinion planetary gearset of the variable compound planetary gearset at a reduced speed through a sun gear and the planet carrier of the simple planetary gearset; a second input route wherein the torque of the input shaft is delivered to the shared planet carrier at an equal speed; and a third input route wherein the torque of the input shaft is delivered to a sun gear of the single pinion planetary gearset of the variable compound planetary gearset at a reduced speed through a sun gear and the planet carrier of the simple planetary gearset.

The first input route may be activated at first, second, third, and fourth forward speeds by an operation of the first clutch variably connecting the ring gears of the variable compound planetary gearset.

The second input route may be activated at fourth, fifth, and sixth forward speeds by an operation of the second clutch variably connecting the shared planet carrier of the variable compound planetary gearset and the sun gear of the simple planetary gearset.

The third input route may be activated at third and fifth forward speeds and a reverse speed by an operation of a third clutch variably connecting the sun gear of the single pinion planetary gearset of the variable compound planetary gearset and the planet carrier of the simple planetary gearset.

Another exemplary six-speed powertrain of an automatic transmission according to an embodiment of the present invention includes: a variable compound planetary gearset including a single pinion planetary gearset and a double pinion planetary gearset interconnected by a shared planet carrier so as to form five operational elements, wherein the shared planet carrier is variably connected to a transmission case via at least one of a second brake and a one-way clutch and also variably connected to an input shaft via a second clutch, ring gears thereof are variably interconnected via a first clutch, one of the ring gears always acts as an output element, and a sun gear of the single pinion planetary gearset is variably connected to the transmission case; and a simple planetary gearset forming three operational elements including a ring gear fixedly connected to one sun gear of the variable compound planetary gearset and variably connected to another sun gear thereof.

The simple planetary gearset may be realized as a double pinion planetary gearset.

In a further embodiment, torque of the input shaft is delivered to the variable compound planetary gearset through input routes comprising: a first input route wherein the torque of the input shaft is delivered to a sun gear of the double pinion planetary gearset of the variable compound planetary gearset at a reduced speed through a ring gear and the planet carrier of the simple planetary gearset; a second input route wherein the torque of the input shaft is delivered to the shared planet carrier at an equal speed; and a third input route wherein the torque of the input shaft is delivered to a sun gear of the single pinion planetary gearset of the variable compound planetary gearset at a reduced speed through a ring gear and the planet carrier of the simple planetary gearset.

The first input route may be activated at first, second, third, and fourth forward speeds by an operation of the first clutch variably connecting the ring gears of the variable compound planetary gearset.

The second input route may be activated at fourth, fifth, and sixth forward: speeds by an operation of the second clutch variably connecting the shared planet carrier of the variable compound planetary gearset and the planet carrier of the simple planetary gearset.

The third input route may be activated at third and fifth forward speeds and a reverse speed by an operation of a third clutch variably connecting the sun gear of the single pinion planetary gearset of the variable compound planetary gearset and the ring gear of the simple planetary gearset.

Such an embodiment may be operated in the following operation: the first clutch and the one-way clutch operate at first forward speed; for a second forward speed, the first brake operates from the first forward speed; for a third forward speed, the first brake is released and the third clutch operates from the second forward speed; for a fourth forward speed, the third clutch is released and the second clutch operates from the third forward speed; for a fifth forward speed, the first clutch is released and the third clutch operates from the fourth forward speed; for a sixth forward speed, the third clutch is released and the first brake operates from the fifth forward speed; and the third clutch and the second brake operate at a reverse speed.

The first clutch may be positioned between the variable compound planetary gearset and the simple planetary gearset.

The first clutch may be positioned opposite of the input shaft with respect to the variable compound planetary gearset.

In another further embodiment, torque of the input shaft is delivered to the variable compound planetary gearset through input routes comprising: a first input route wherein the torque of the input shaft is delivered to a sun gear of the double pinion planetary gearset of the variable compound planetary gearset at a reduced speed through a sun gear and a ring gear of the simple planetary gearset; a second input route wherein the torque of the input shaft is delivered to the shared planet carrier at an equal speed; and a third input route wherein the torque of the input shaft is delivered to a sun gear of the single pinion planetary gearset of the variable compound planetary gearset at a reduced speed through a sun gear and a ring gear of the simple planetary gearset.

The first input route may be activated at first, second, third, and fourth forward speeds by an operation of the first clutch variably connecting the ring gears of the variable compound planetary gearset.

The second input route may be activated at fourth, fifth, and sixth forward speeds by an operation of the second clutch variably connecting the shared planet carrier of the variable compound planetary gearset and the sun gear of the simple planetary gearset.

The third input route may be activated at third and fifth forward speeds and a reverse speed by an operation of a third clutch variably connecting the sun gear of the single pinion planetary gearset of the variable compound planetary gearset and the ring gear of the simple planetary gearset.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

Embodiments of the present invention will hereinafter be described in detail with reference to the accompanying drawings.

Figures 1, 2:
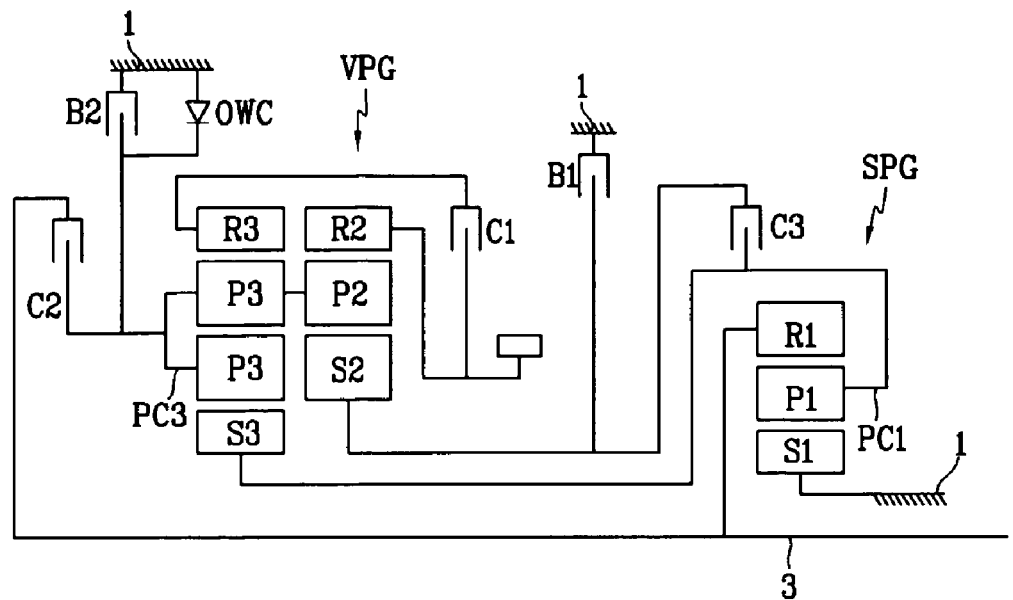
FIG. 1 is a schematic diagram of a powertrain according to a first embodiment of the present invention.
FIG. 2 is an operational chart applicable to any embodiment of the present invention.

As shown in FIG. 1, a powertrain according to a first embodiment of the present invention includes a single pinion simple planetary gearset SPG having a first sun gear S1, a first planetary gear P1, and a first ring gear R1. The single pinion simple planetary gearset SPG is disposed to a front of an input shaft 3 connected to an output side of an engine via a torque converter.

A powertrain according to a first embodiment of the present invention further includes a variable compound planetary gearset VPG. The variable compound planetary gearset VPG includes a single pinion planetary gearset and a double pinion planetary gearset. The single pinion planetary gearset is disposed to a rear of the single pinion simple planetary gearset SPG and includes a second sun gear S2, a second planetary gear P2, and a second ring gear R2. The double pinion planetary gearset is disposed adjacent to the single pinion simple planetary gearset SPG, and includes a third sun gear S3, a pair of third planetary gears P3, and a third ring gear R3. One of the third planetary gears P3 is connected to the second planetary gear P2 such that they may be independently rotate.

The single pinion simple planetary gearset SPG includes, as its operational elements, the first sun gear S1, the first ring gear R1, and a first planet carrier PC1 rotatably supporting the first planetary gear P1 engaged with the first sun gear S1 and the first ring gear R1.

The variable compound planetary gearset VPG includes, as its operational elements, second and third sun gears S2 and S3, second and third ring gears R2 and R3, and a third planet carrier PC3 rotatably supporting both of the second planetary gear P2 engaged with the second sun gear S2 and the second ring gear R2 and the pair of third planetary gears P3 engaged with the third sun gear S3 and the third ring gear R3.

Regarding the arrangement of the planetary gearsets, the single pinion simple planetary gearset SPG is disposed forward in a transmission, and the variable compound planetary gearset VPG is disposed rearward in the transmission.

The five operational elements of the variable compound planetary gearset VPG include an input element (i.e., the third planet carrier PC3) variably connected to an input shaft 3 and an output element (i.e. the second ring gear R2) for outputting torque.

The three operational elements of the single pinion simple planetary gearset SPG includes an input element fixedly connected to the input shaft 3. In addition, the three operational elements of the single pinion simple planetary gearset SPG includes an operational element fixedly connected to one of two operational elements of the variable compound planetary gearset VPG and variably connected to another of the two.

Hereinafter, the third sun gear S3 of the double pinion planetary gearset of the variable compound planetary gearset VPG is referred to as a first operational element. The third ring gear R3 thereof is referred to as a second operational element. The second ring gear R2 of the single pinion planetary gearset of the variable compound planetary gearset VPG is referred to as a third operational element. The third planet carrier PC3 shared by the second and third planetary gears P2 and P3 is referred to as a fourth operational element. In addition, the second sun gear S2 is referred to as a fifth operational element.

In addition, hereinafter, the first ring gear R1 of the single simple pinion planetary gearset SPG is referred to as a sixth operational element. The first planet carrier PC1 is referred to as a seventh operational element. Finally, the first sun gear S1 is referred to as an eighth operational element.

Such eight operational elements are connected as follows.

Firstly, the third sun gear S3 of the first operational element is fixedly interconnected with the first planet carrier PC1 of the seventh operational element. The third ring gear R3 of the second operational element is variably connected with the second ring gear R2 of the third operational element via a first clutch C1.

Here, the first clutch C1 is positioned between the variable compound planetary gearset VPG and the single pinion simple planetary gearset SPG.

Third planet carrier PC3 of the fourth operational element is connected to the transmission case 1 via a second brake B2 and a one-way clutch OWC. The first ring gear R1 of the sixth operational element is variably connected to the third planet carrier PC3 of the fourth operational element via a second clutch C2.

In addition, the second sun gear S2 of the fifth operational element is variably connected to the transmission case 1 and the first planet carrier PC1 of the seventh operational element via a first brake B1 and a third clutch C3, respectively.

The first sun gear S1 of the eighth operational element is fixedly connected to the transmission case 1 so as to always act as a fixed element. The second ring gear R2 of the third operational element always act as an output element. The first ring gear R1 of the sixth operational element is fixedly connected to the input shaft 3 so as to always act as an input element.

The torque of the input shaft 3 is delivered to the variable compound planetary gearset VPG through three input routes.

According to a first input route, the torque of the input shaft 3 is delivered to the third sun gear S3 of the first operational element at a reduced speed through the first ring gear R1 of the sixth operational element and the first planet carrier PC1 of the seventh operational element.

The first input route is enabled at first, second, third, and fourth forward speeds by an operation of the first clutch C1 that variably interconnects the third ring gear R3 of the second operational element and the second ring gear R2 of the third operational element.

According to a second input route, the torque of the input shaft 3 is delivered to the third planet carrier PC3 of the fourth operational element at an equal speed.

The second input route is enabled at fourth, fifth, and sixth forward speeds by an operation of the second clutch C2 that variably interconnects the third planet carrier PC3 of the fourth operational element and the first ring gear R1 of the sixth operational element.

According to a third input route, the torque of the input shaft 3 is delivered to the second sun gear S2 of the fifth operational element through the first ring gear R1 of the sixth operational element and the first planet carrier PC1 of the seventh operational element.

The third input route is enabled at third and fifth forward speeds and a reverse speed by an operation of the third clutch C3 that variably interconnects the second sun gear S2 of the fifth operational element and the first planet carrier PC1 of the seventh operational element.

Such a powertrain is operated according to an operational chart as shown in FIG. 2.

The first clutch C1 and the one-way clutch OWC operate at first forward speed. For a second forward speed, the first brake B1 operates from the first forward speed. For a third forward speed, the first brake B1 is released and the third clutch C3 operates from the second forward speed. For a fourth forward speed, the third clutch C3 is released and the second clutch C2 operates from the third forward speed. For a fifth forward speed, the first clutch C1 is released and the third clutch C3 operates from the fourth forward speed. For a sixth forward speed, the third clutch C3 is released and the first brake B1 operates from the fifth forward speed. The third clutch C3 and the second brake B2 operate at a reverse speed.

Shifting operation of the powertrain according to a first embodiment of the present invention is hereinafter described in detail with reference to FIG. 3 and FIG. 4.

Figure 3:
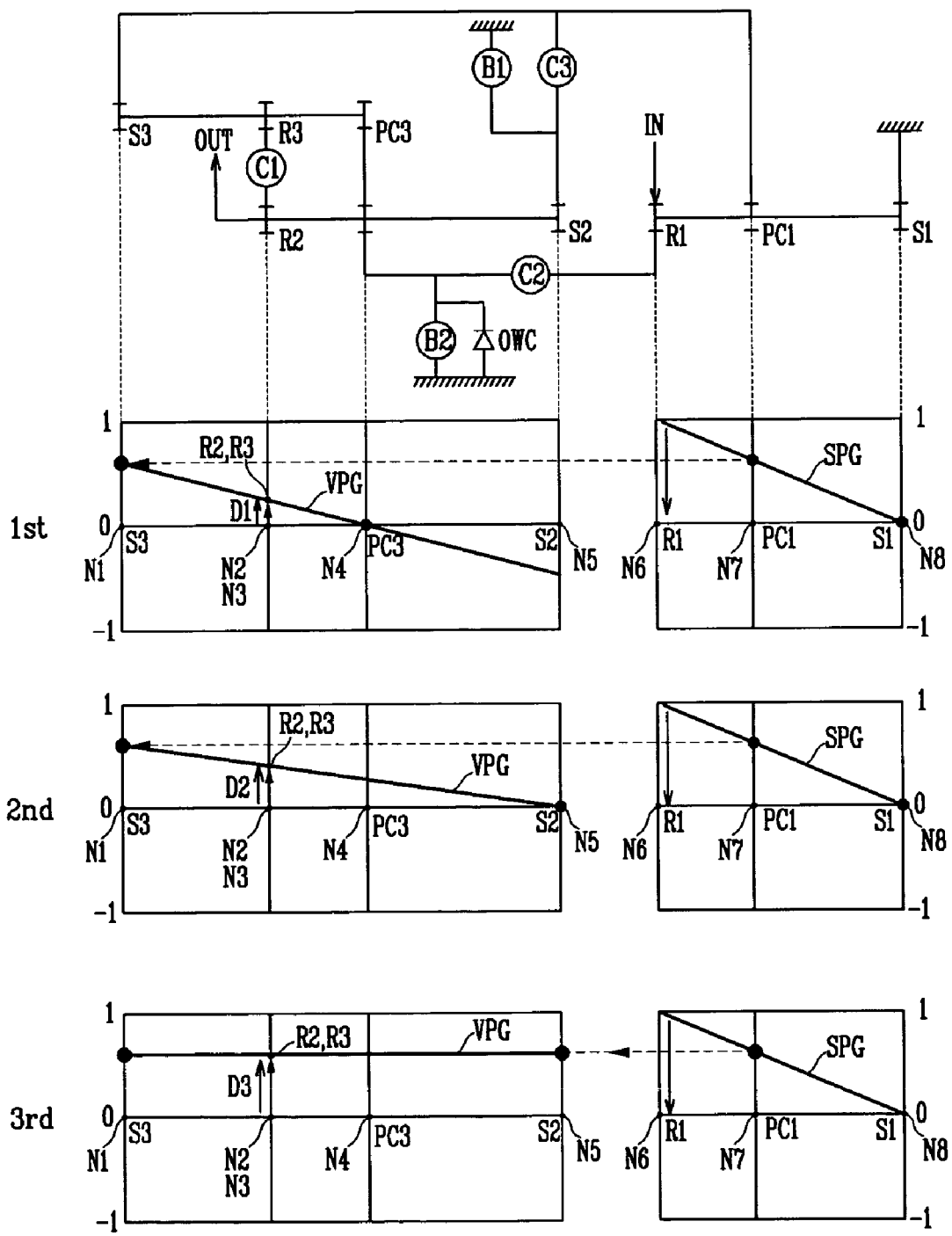
FIG. 3 is a speed diagram for first to third forward speeds of a powertrain according to a first embodiment of the present invention.
Figure 4:
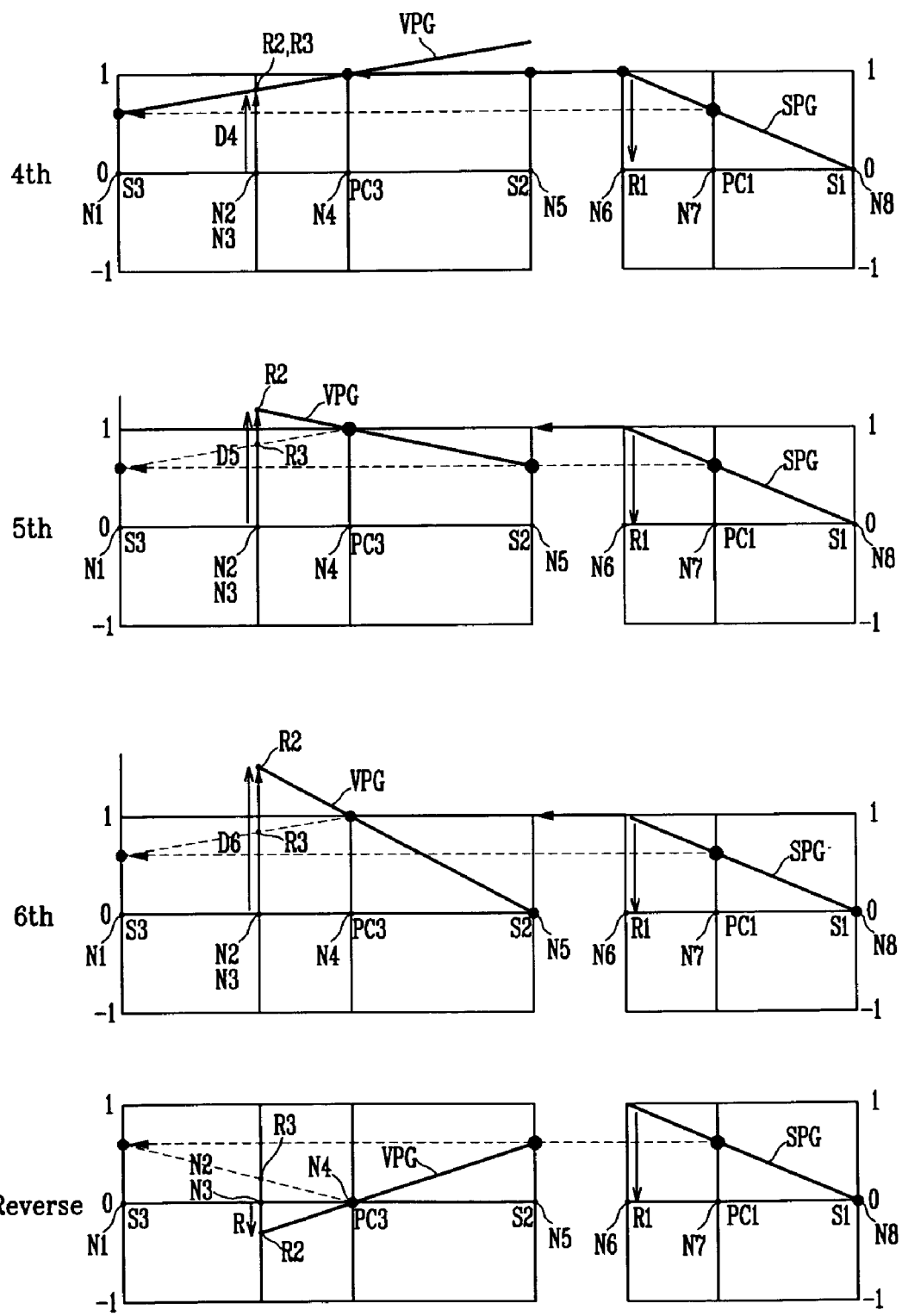
FIG. 4 is a speed diagram for fourth to sixth forward speeds and reverse speed of a powertrain according to a first embodiment of the present invention.

Operational elements of a powertrain according to an embodiment of the present invention form nodes as shown in speed diagrams of FIG. 3 and FIG. 4.

A first node N1 is formed by the third sun gear S3 of the first operational element. A second node N2 is formed by the third ring gear R3 of the second operational element. A third node N3 is formed by the second ring gear R2 of the third operational element. A fourth node N4 is formed by the third planet carrier PC3 of the fourth operational element. A fifth node N5 is formed by the second sun gear S2 of the fifth operational element. A sixth node N6 is formed by the first ring gear R1 of the sixth operational element. A seventh node N7 is formed by the first planet carrier PC1 of the seventh operational element. An eighth node N8 is formed by the first sun gear S1 of the eighth operational element.

According to such a powertrain, torque of the input shaft 3 is directly input to the sixth node N6 (according to the present embodiment, the first ring gear R1) at an equal rotation speed. In addition, the torque of the input shaft 3 is also input to the first node N1 (i.e., the third sun gear S3) of the variable compound planetary gearset VPG at a reduced speed through the seventh node N7 (according to the present embodiment, the first planet carrier PC1).

At a first forward speed, the first clutch C1 and the one-way clutch OWC operate. Therefore, the fourth node N4 and the eighth node N8 act as fixed elements. Therefore, according to cooperative reaction of the single pinion simple planetary gearset SPG and the variable compound planetary gearset VPG, the speed diagram becomes as shown in a first speed diagram in FIG. 3. Therefore, shifting to the first forward speed is realized because speed is changed to and output as D1 through the output element of the third node N3.

Operation of the first clutch C1, i.e., connection of the second and third ring gears R2 and R3, implies that the second and third nodes N2 and N3 are located in the same position in the speed diagram.

For a second forward speed, the first brake B1 operates from the first speed.

Again at the second forward speed, torque of the input shaft 3 is directly input to the first ring gear R1 of the sixth node N6 at an equal rotation speed, and also input to the third sun gear S3 of the variable compound planetary gearset VPG.

In addition thereto, the fifth node N5 and the eighth node N8 act as fixed elements.

Therefore, according to cooperative reaction of the single pinion simple planetary gearset SPG and the variable compound planetary gearset VPG, the speed diagram becomes as shown in a second speed diagram in FIG. 3. Therefore, shifting to the second forward speed is realized because speed is changed to and output as D2 through the output element of the third node N3.

For a third forward speed, the first brake B1 is released and the third clutch C3 operates from the second forward speed.

Again at the third forward speed, torque of the input shaft 3 is directly input to the first ring gear R1 of the sixth node N6 at an equal rotation speed, and also input to the third sun gear S3 of the variable compound planetary gearset VPG.

In addition thereto, torque of the input shaft 3 is input to the second sun gear S2 of the fifth node N5 through the first planet carrier PC1 of the seventh node N7.

Therefore, the first and fifth node N1 and N5 of the variable compound planetary gearset VPG rotates at the same speed, and accordingly, the speed diagram becomes as shown in a third speed diagram in FIG. 3. Therefore, shifting to the third forward speed is realized because speed is changed to and output as D3 through the output element of the third node N3.

For a fourth forward speed, the third clutch C3 is released and the second clutch C2 operates from the third forward speed.

In this case, the torque of the input shaft 3 is input to both of the sixth node N6 (i.e., the first ring gear R1) of the single pinion simple planetary gearset SPG and the fourth node N4 (i.e., the third planet carrier PC3) of the variable compound planetary gearset VPG. In addition, the torque of the input shaft 3 is input to the third sun gear S3 of the variable compound planetary gearset VPG at a reduced speed.

Therefore, according to cooperative reaction of the single pinion simple planetary gearset SPG and the variable compound planetary gearset VPG, the speed diagram becomes as shown in a fourth speed diagram in FIG. 4. Therefore, shifting to the fourth forward speed is realized because speed is changed to and output as D4 through the output element of the third node N3.

For a fifth forward speed, the first clutch C1 is released and the third clutch C3 operates from the fourth forward speed.

Therefore, the fifth node N5 (i.e., the second sun gear S2 of the variable compound planetary gearset VPG) becomes interconnected to the seventh node N7 (i.e., the first planet carrier PC1 of the single pinion simple planetary gearset SPG) such that the fifth node N5 receives the input torque though the seventh node N7.

In addition, the third planet carrier PC3 of the variable compound planetary gearset VPG receives the input torque through the second clutch C2.

When the first clutch C1 is released, the second and third ring gears R2 and R3 of the second and third nodes N2 and N3 may independently rotate. Therefore, the variable compound planetary gearset VPG is expressed as two split speed lines as shown in FIG. 4.

Therefore, according to cooperative reaction of the single pinion simple planetary gearset SPG and the variable compound planetary gearset VPG, the speed diagram becomes as shown in a fifth speed diagram in FIG. 4. Therefore, shifting to the fifth forward speed is realized because speed is changed to and output as D5 through the output element of the third node N3.

For a sixth forward speed, the third clutch C3 is released and the first brake B1 operates from the fifth forward speed.

Then, the sixth node N6 (i.e., the first ring gear R1 of the single pinion simple planetary gearset SPG) and the fourth node N4 (i.e., the third planet carrier PC3 of the variable compound planetary gearset VPG) receives torque of the input shaft 3 at the same speed.

In addition, the fifth node N5 (the second sun gear S2 of the variable compound planetary gearset VPG) and the eighth node N8 (i.e., the first sun gear S1 of the single pinion simple planetary gearset SPG) act as fixed elements.

Therefore, according to cooperative reaction of the single pinion simple planetary gearset SPG and the variable compound planetary gearset VPG, the speed diagram becomes as shown in a sixth speed diagram in FIG. 4. Therefore, shifting to the sixth forward speed is realized because speed is changed to and output as D6 through the output element of the third node N3.

And, at a reverse speed, the third clutch C3 and the second brake B2 operate.

Therefore, the fifth node N5 (i.e., the second sun gear S2 of the variable compound planetary gearset VPG) becomes interconnected to the seventh node N7 (i.e., the first planet carrier PC1 of the single pinion simple planetary gearset SPG) such that the fifth node N5 receives the input torque though the seventh node N5.

In addition, the fourth node N4 (i.e., the third planet carrier PC3 of the variable compound planetary gearset VPG) acts as a fixed element.

Therefore, according to cooperative reaction of the single pinion simple planetary gearset SPG and the variable compound planetary gearset VPG, the speed diagram becomes as shown in a reverse speed diagram in FIG. 4. Therefore, shifting to the reverse speed is realized because speed is changed to and output as R through the output element of the third node N3.

Hereinafter, a powertrain according to a second embodiment of the present invention is described in detail with reference to FIG. 5 to FIG. 7.

Figure 5:
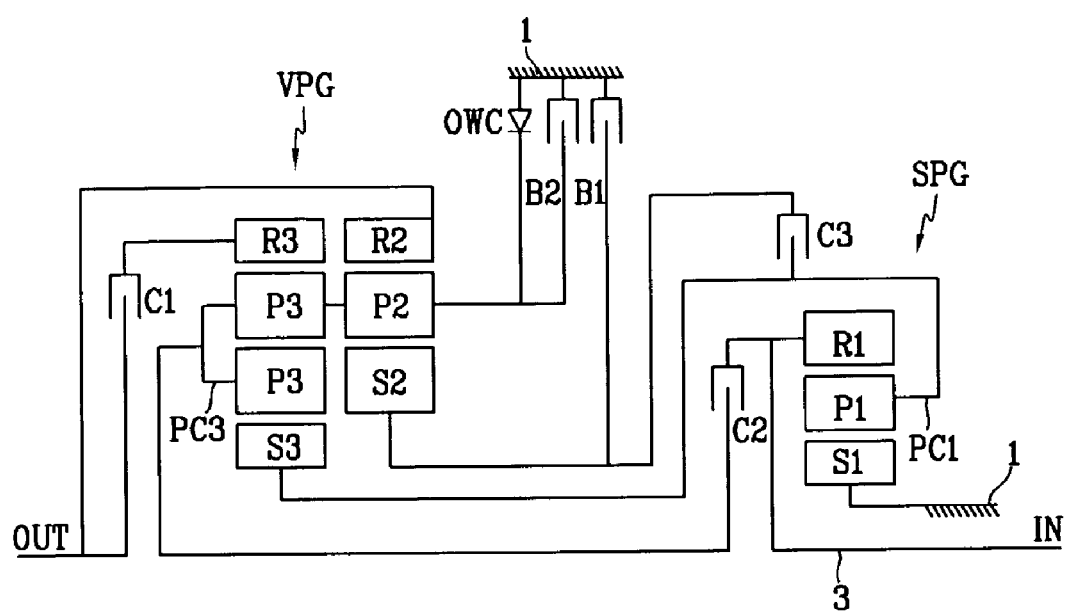
FIG. 5 to FIG. 7 are a schematic diagram, a speed diagram for first to third forward speeds, and a speed diagram for fourth to sixth forward speeds and reverse speed of powertrain according to a second embodiment of the present invention, respectively.

FIG. 5 is a schematic diagram of a powertrain according to a second embodiment of the present invention.

As same as the first embodiment, the powertrain according to a second embodiment of the present invention includes a single pinion simple planetary gearset SPG disposed to a front of an input shaft 3 connected to an output side of an engine via a torque converter. A powertrain according to the second embodiment further includes a variable compound planetary gearset VPG. The variable compound planetary gearset VPG includes a single pinion planetary gearset and a double pinion planetary gearset. The single pinion planetary gearset is disposed to a rear of the single pinion simple planetary gearset SPG, and the double pinion planetary gearset is disposed adjacent to the single pinion planetary gearset. One of the third planetary gears P3 is connected to the second planetary gear P2 such that they may be independently rotate.

The single pinion simple planetary gearset SPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, a second planet carrier PC2 rotatably supporting a second planetary gear P2 engaged with the second sun gear S2 and the second ring gear R2, and a third planet carrier PC3 rotatably supporting a pair of third planetary gears P3 engaged with the third sun gear S3 and the third ring gear R3.

Regarding the arrangement of the planetary gearsets, the single pinion simple planetary gearset SPG is disposed forward in a transmission, and the variable compound planetary gearset VPG is disposed rearward in the transmission, as same as a powertrain of the first embodiment.

In addition, as same as a powertrain of the first embodiment, the variable compound planetary gearset VPG forms five operational elements, and the single pinion simple planetary gearset SPG forms three operational elements.

Interconnection of such operational elements is basically similar to the first embodiment. However, according to the present embodiment, the first clutch C1 interconnecting the third ring gear R3 and the second ring gear R2 is disposed opposite of the input shaft 3 with respect to the variable compound planetary gearset VPG.

In the first embodiment, the third planet carrier PC3 is variably connected to the transmission case 1 via the second brake B2 and the one-way clutch OWC arranged in parallel.

However, in the present embodiment, the third planet carrier PC3 is variably connected merely to the first ring gear R1 via the second clutch C2, while the second brake B2 and the one-way clutch OWC is connected to a second planet carrier PC2 disposed opposite of the third planet carrier PC3. The second and third planet carriers PC2 and PC3 has the same function of carrying the second and third planetary gears P2 and P3, so they may be functionally regarded as a same fourth operational element.

Input routes for delivering the torque of the input shaft 3 to the variable compound planetary gearset VPG is the same as the first embodiment, and the same operational chart shown in FIG. 2 may be used for the present embodiment.

Figure 6:
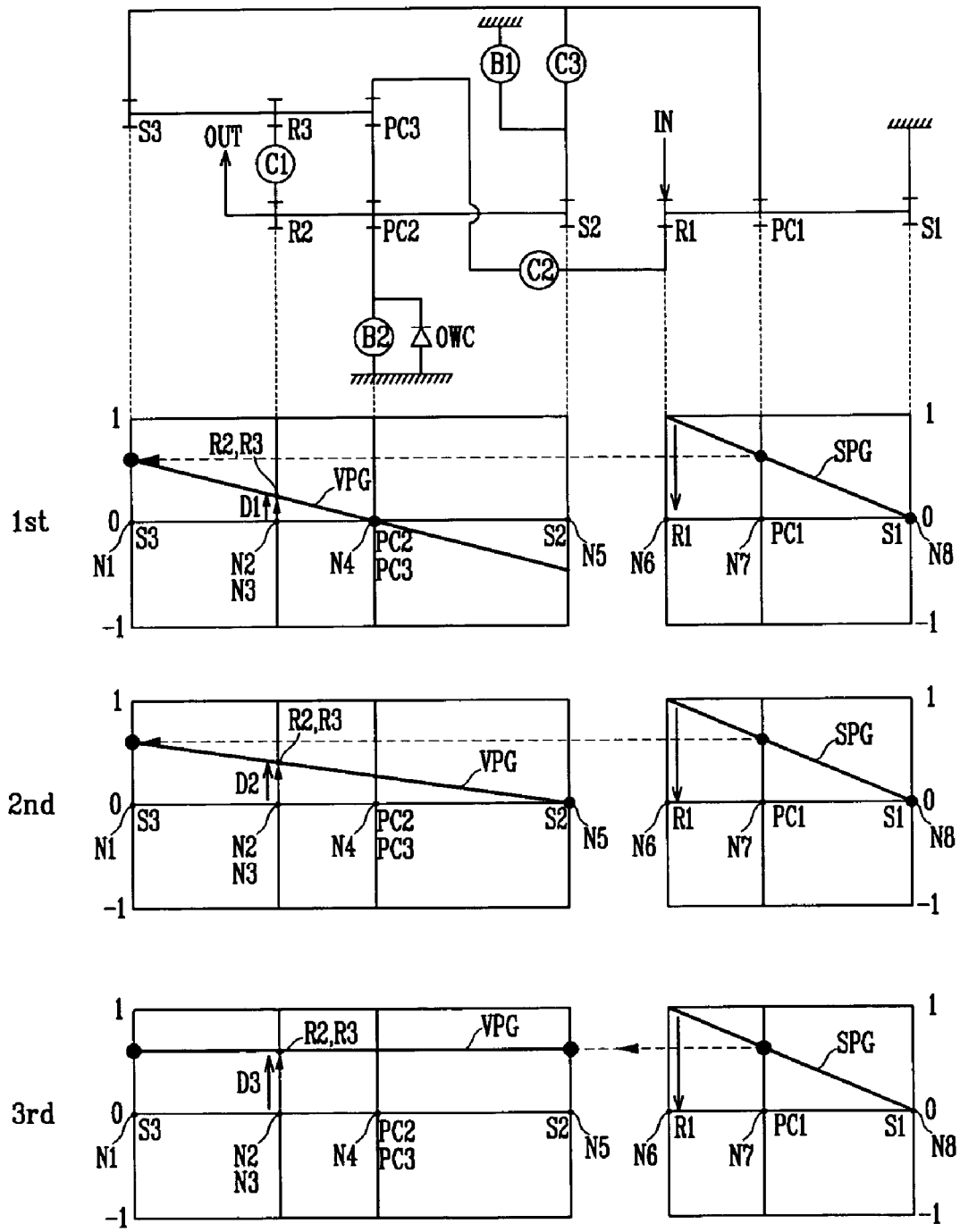
Figure 7:
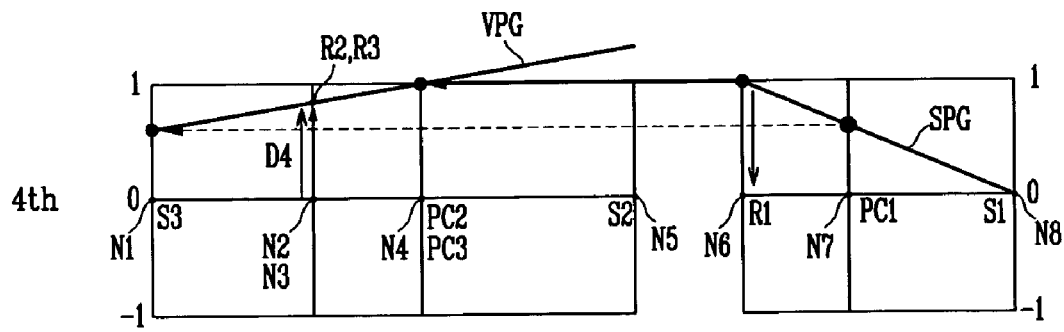
Figure 7:
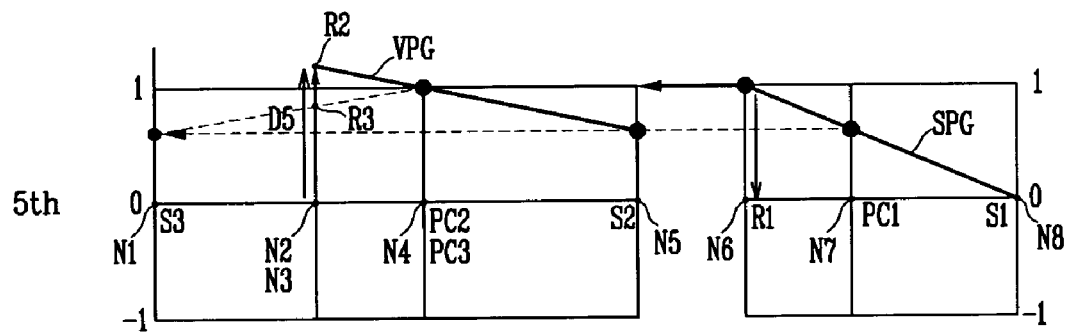
Figure 7:
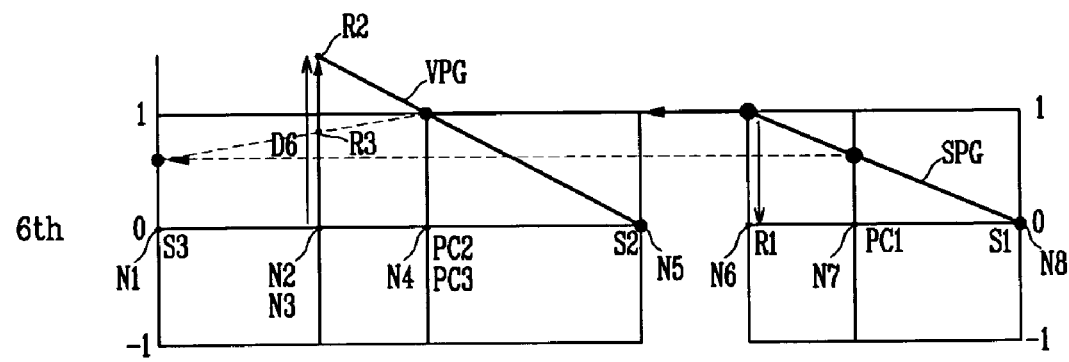
Figure 7:
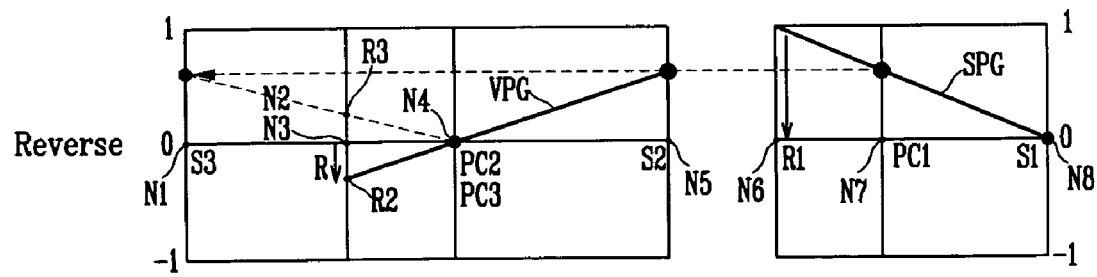

Therefore, shifting operation of the powertrain according to a second embodiment of the present invention shown in FIG. 6 and FIG. 7 is the same as described in connection with the first embodiment.

Hereinafter, a powertrain according to a third embodiment of the present invention is described in detail with reference to FIG. 8 to FIG. 10.

Figure 8:
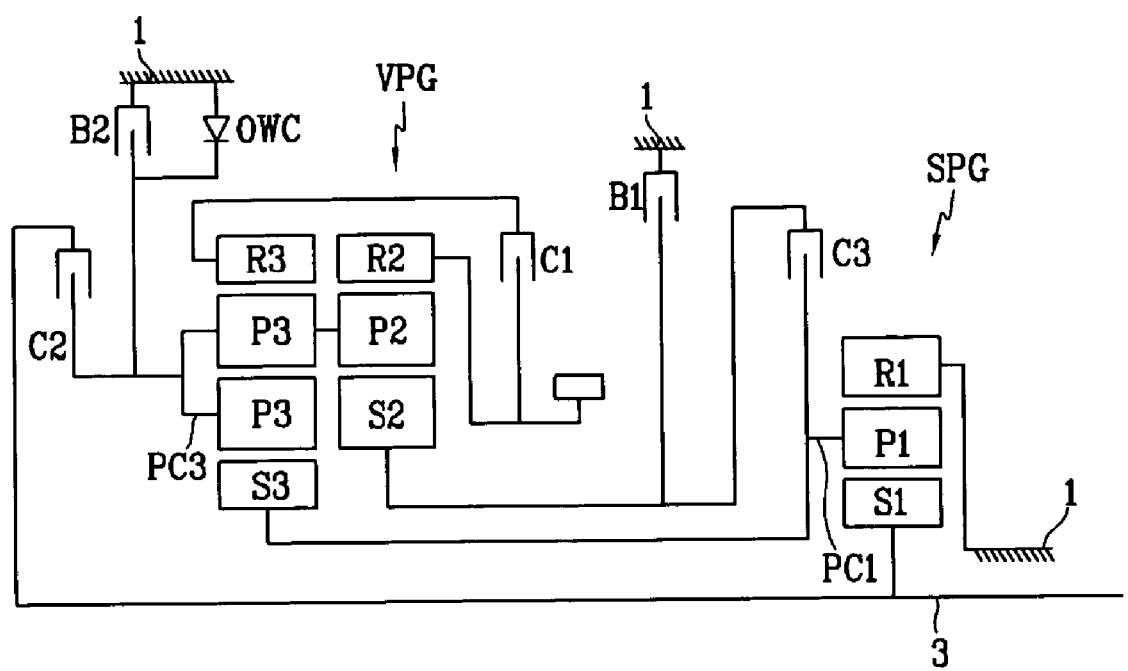
FIG. 8 to FIG. 10 are a schematic diagram, a speed diagram for first to third forward speeds, and a speed diagram for fourth to sixth forward speeds and reverse speed of a powertrain according to a third embodiment of the present invention, respectively.

FIG. 8 is a schematic diagram of a powertrain according to a third embodiment of the present invention.

As same as the first embodiment, the powertrain according to a third embodiment of the present invention includes a single pinion simple planetary gearset SPG disposed to a front of an input shaft 3 connected to an output side of an engine via a torque converter. A powertrain according to the third embodiment further includes a variable compound planetary gearset VPG. The variable compound planetary gearset VPG includes a single pinion planetary gearset and a double pinion planetary gearset. The single pinion planetary gearset is disposed to a rear of the single pinion simple planetary gearset SPG, and the double pinion planetary gearset is disposed adjacent to the single pinion planetary gearset. One of the third planetary gears P3 is connected to the second planetary gear P2 such that they may be independently rotate.

The single pinion simple planetary gearset SPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, and a third planet carrier PC3 rotatably supporting both of a second planetary gear P2 engaged with the second sun gear S2 and the second ring gear R2 and a pair of third planetary gears P3 engaged with the third sun gear S3 and the third ring gear R3.

Regarding the arrangement of the planetary gearsets, the single pinion simple planetary gearset SPG is disposed forward in a transmission, and the variable compound planetary gearset VPG is disposed rearward in the transmission, as same as a powertrain of the first embodiment.

In addition, as same as a powertrain of the first embodiment, the variable compound planetary gearset VPG forms five operational elements, and the single pinion simple planetary gearset SPG forms three operational elements.

However, according to the present embodiment, in comparison with the first embodiment, the first sun gear S1 is used for the sixth operational element, the first planet carrier PC1 is used for the seventh operational element, and the first ring gear R1 is used for the eighth operational element That is, the first sun gear S1 (instead of the first ring gear R1 of the first embodiment) is variably connected to the third planet carrier PC3 of the fourth operational element via the second clutch C2 and forms the sixth operational element. In addition, the first ring gear R1 (instead of the first sun gear S1 of the first embodiment) is fixedly connected to the transmission case 1 so as to always act as a fixed element, and forms the eighth operational element. The first sun gear S1 of the sixth operational element is fixedly connected to the input shaft 3 so as to always act as an input element.

As same as the first embodiment, the first clutch C1 variably connecting the second and third ring gears R2 and R3 is positioned between the variable compound planetary gearset VPG and the single pinion simple planetary gearset SPG.

Input routes for delivering the torque of the input shaft 3 to the variable compound planetary gearset VPG is similar to the first embodiment. The difference lies in that, the variable compound planetary gearset VPG receives the input torque by the operation of the first sun gear S1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first sun gear S1 of the sixth operational element.

The same operational chart shown in FIG. 2 may be applied to the present embodiment.

Figure 9:
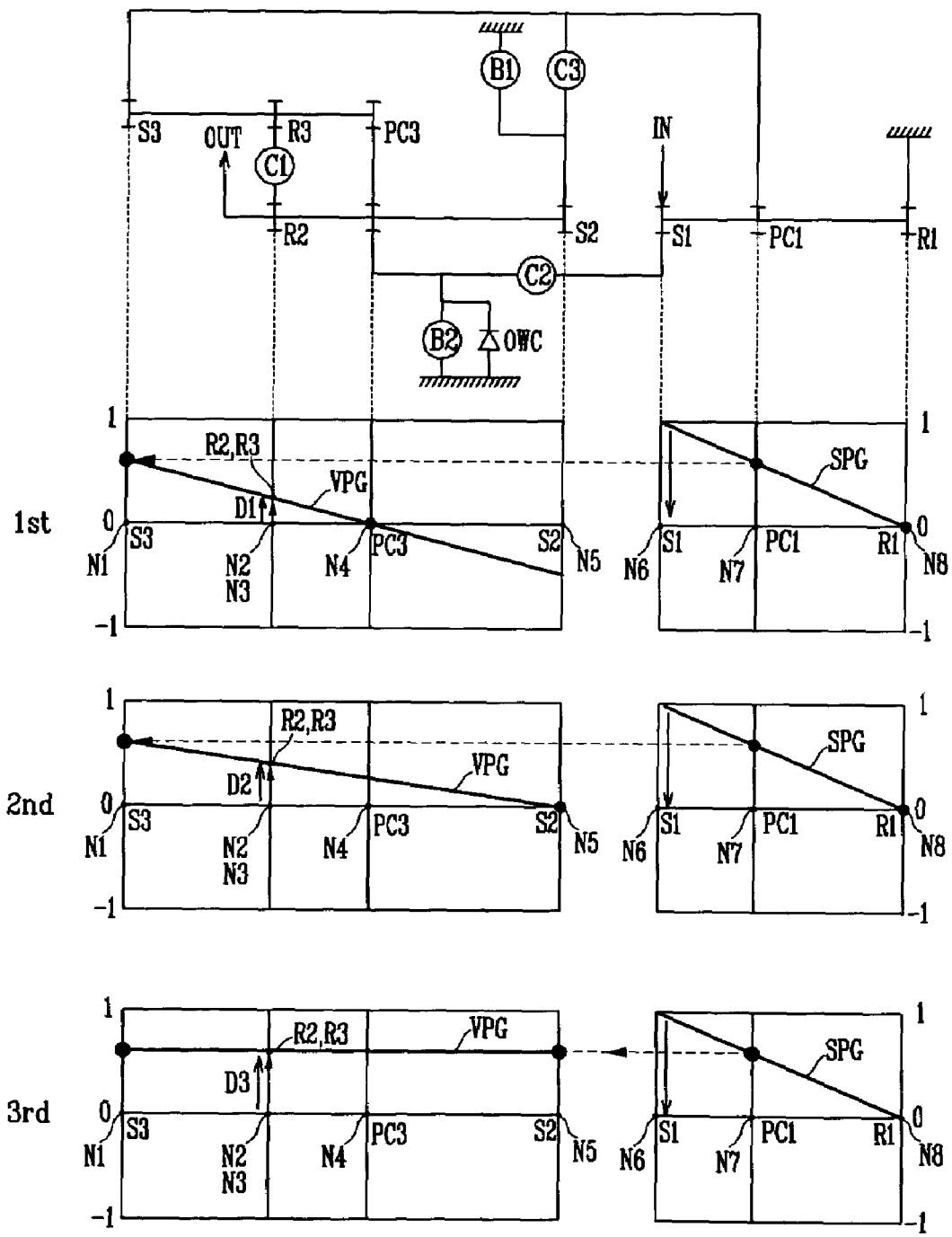
Figure 10:
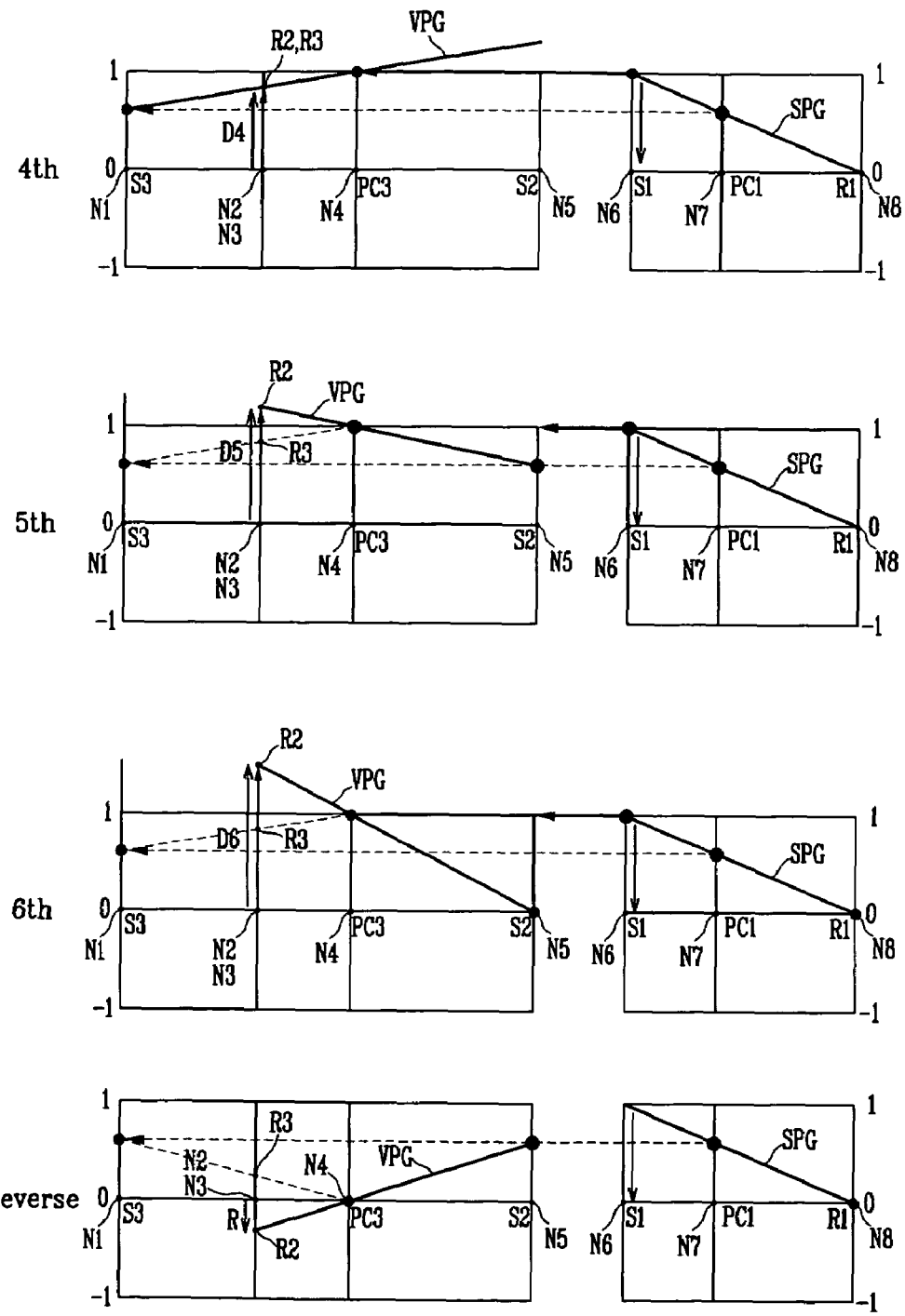

Therefore, speed diagram of the powertrain according to a third embodiment of the present invention is as shown in FIG. 9 and FIG. 10, wherein positions of the first sun gear S1 and the fist ring gear R1 are interchanged in comparison with FIG. 3 and FIG. 4. As shown in FIG. 9 and FIG. 10, shifting operation of the powertrain according to the present embodiment is effectively identical to that of a powertrain according to the first embodiment.

Figure 11:
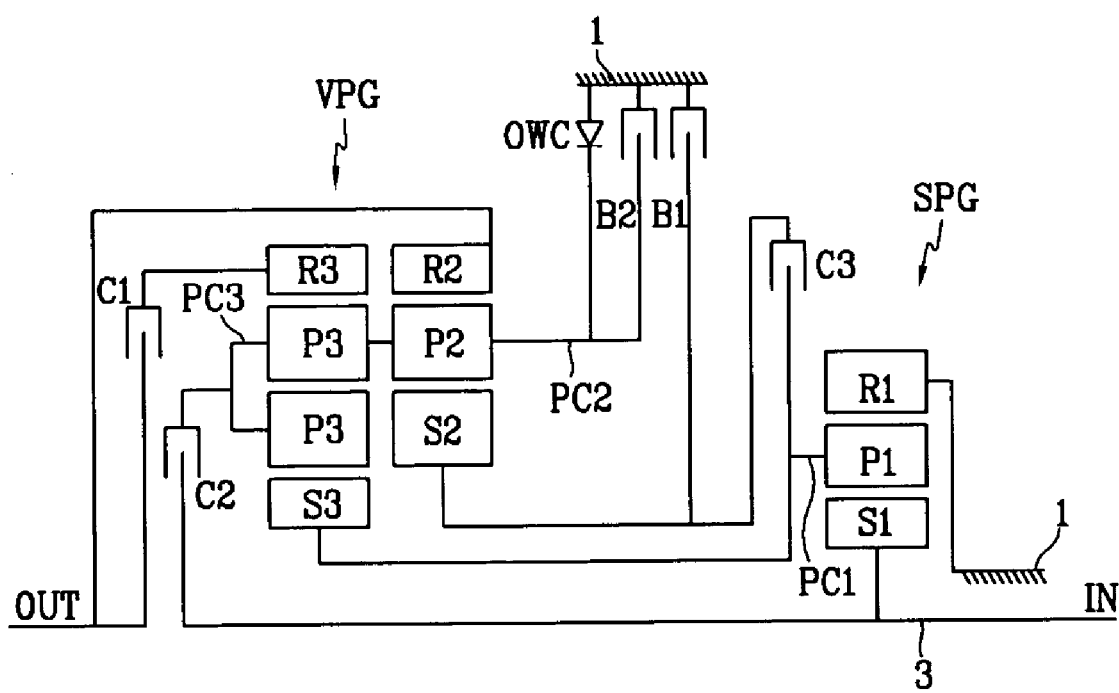
FIG. 11 to FIG. 13 are a schematic diagram, a speed diagram for first to third forward speeds, and a speed diagram for fourth to sixth forward speeds and reverse speed of a powertrain according to a fourth embodiment of the present invention, respectively.

Hereinafter, a powertrain according to a fourth embodiment of the present invention is described in detail with reference to FIG. 11 to FIG. 13.

FIG. 10 is a schematic diagram of a powertrain according to a fourth embodiment of the present invention.

As same as the first embodiment, the powertrain according to a fourth embodiment of the present invention includes a single pinion simple planetary gearset SPG disposed to a front of an input shaft 3 connected to an output side of an engine via a torque converter. A powertrain according to the fourth embodiment further includes a variable compound planetary gearset VPG. The variable compound planetary gearset VPG includes a single pinion planetary gearset and a double pinion planetary gearset. The single pinion planetary gearset is disposed to a rear of the single pinion simple planetary gearset SPG, and the double pinion planetary gearset is disposed adjacent to the single pinion planetary gearset. One of the third planetary gears P3 is connected to the second planetary gear P2 such that they may be independently rotate.

The single pinion simple planetary gearset SPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, a second planet carrier PC2 rotatably supporting a second planetary gear P2 engaged with the second sun gear S2 and the second ring gear R2, and a third planet carrier PC3 rotatably supporting a pair of third planetary gears P3 engaged with the third sun gear S3 and the third ring gear R3.

Regarding the arrangement of the planetary gearsets, the single pinion simple planetary gearset SPG is disposed forward in a transmission, and the variable compound planetary gearset VPG is disposed rearward in the transmission, as same as a powertrain of the first embodiment.

In addition, as same as a powertrain of the first embodiment, the variable compound planetary gearset VPG forms five operational elements, and the single pinion simple planetary gearset SPG forms three operational elements.

However, according to the present embodiment, in comparison with the first embodiment, the first sun gear S1 is used for the sixth operational element, the first planet carrier PC1 is used for the seventh operational element, and the first ring gear R1 is used for the eighth operational element That is, the first sun gear S1 (instead of the first ring gear R1 of the first embodiment) is variably connected to the third planet carrier PC3 of the fourth operational element via the second clutch C2 and forms the sixth operational element. In addition, the first ring gear R1 (instead of the first sun gear S1 of the first embodiment) is fixedly connected to the transmission case 1 so as to always act as a fixed element, and forms the eighth operational element. The first sun gear S1 of the sixth operational element is fixedly connected to the input shaft 3 so as to always act as an input element.

Interconnection of such operational elements is basically similar to the first embodiment. However, according to the present embodiment, the first clutch C1 interconnecting the third ring gear R3 and the second ring gear R2 is disposed opposite of the input shaft 3 with respect to the variable compound planetary gearset VPG.

In the first embodiment, the third planet carrier PC3 is variably connected to the transmission case 1 via the second brake B2 and the one-way clutch OWC arranged in parallel.

However, in the present embodiment, the third planet carrier PC3 is variably connected merely to the first sun gear S1 via the second clutch C2, while the second brake B2 and the one-way clutch OWC is connected to a second planet carrier PC2 disposed opposite of the third planet carrier PC3.

The second and third planet carriers PC2 and PC3 has the same function of carrying the second and third planetary gears P2 and P3, so they may be functionally regarded as a same fourth operational element.

Input routes for delivering the torque of the input shaft 3 to the variable compound planetary gearset VPG is similar to the first embodiment. The difference lies in that, the variable compound planetary gearset VPG receives the input torque by the operation of the first sun gear S1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first sun gear S1 of the sixth operational element.

The same operational chart shown in FIG. 2 may be applied to the present embodiment.

Figure 12:
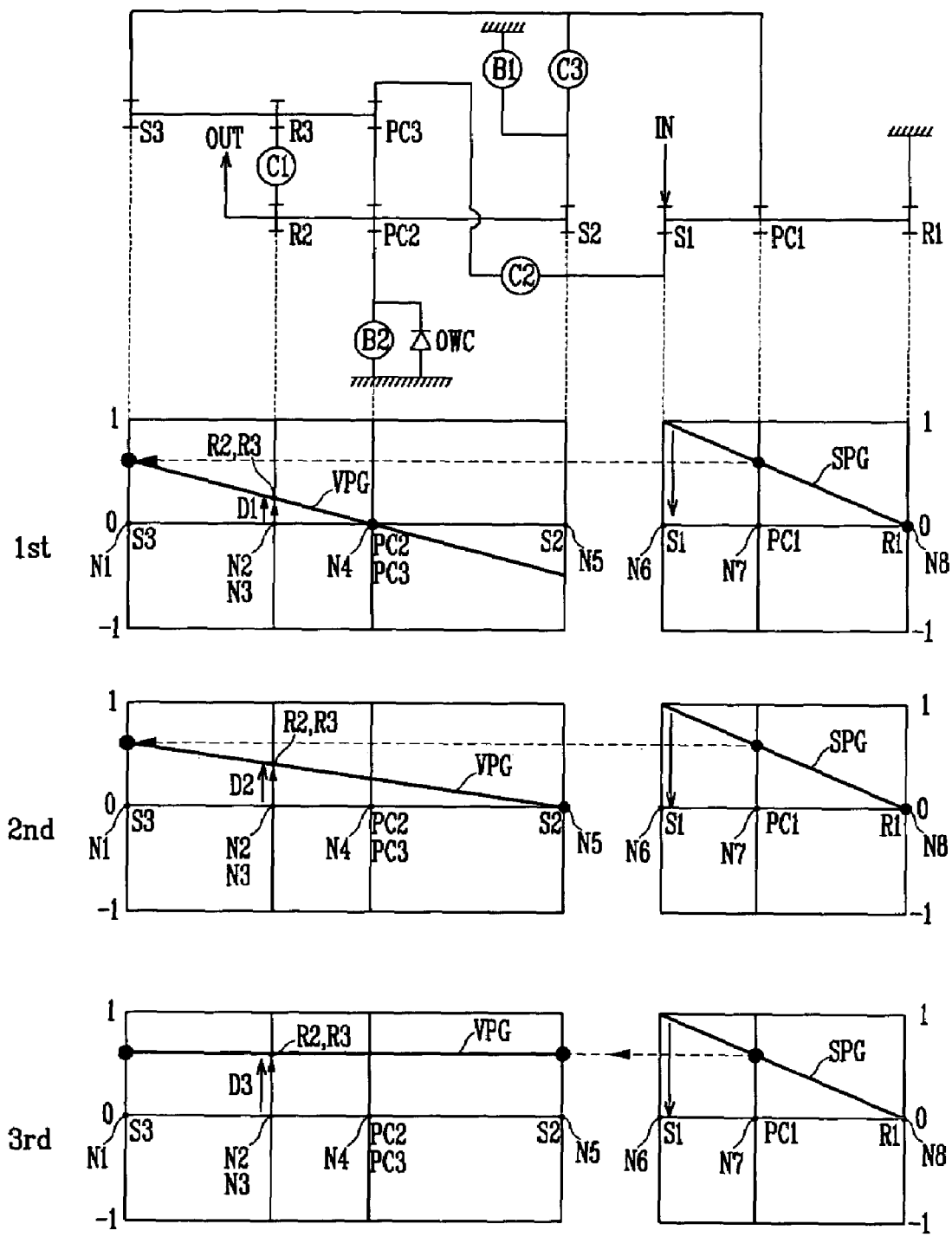
Figure 13:
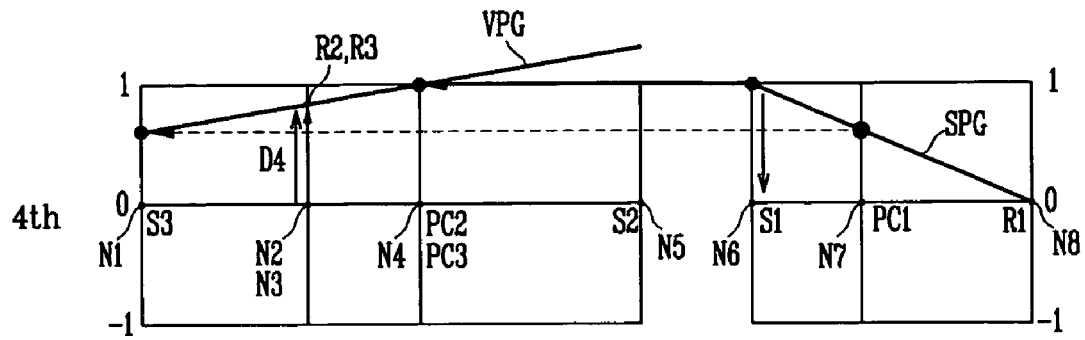
Figure 13:
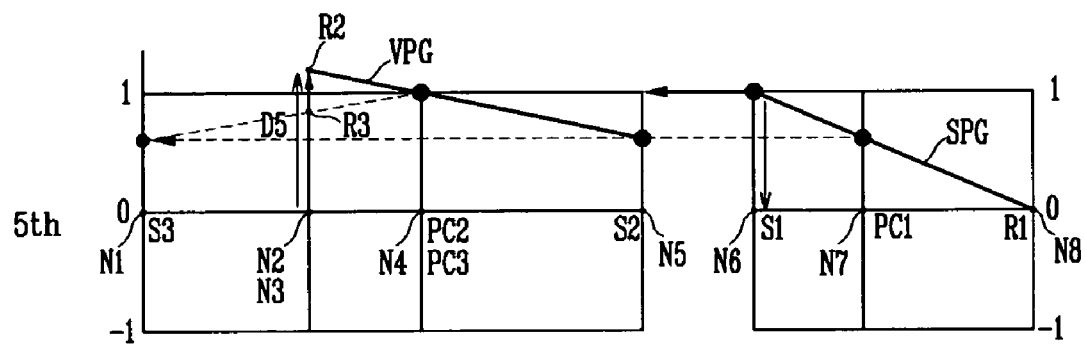
Figure 13:
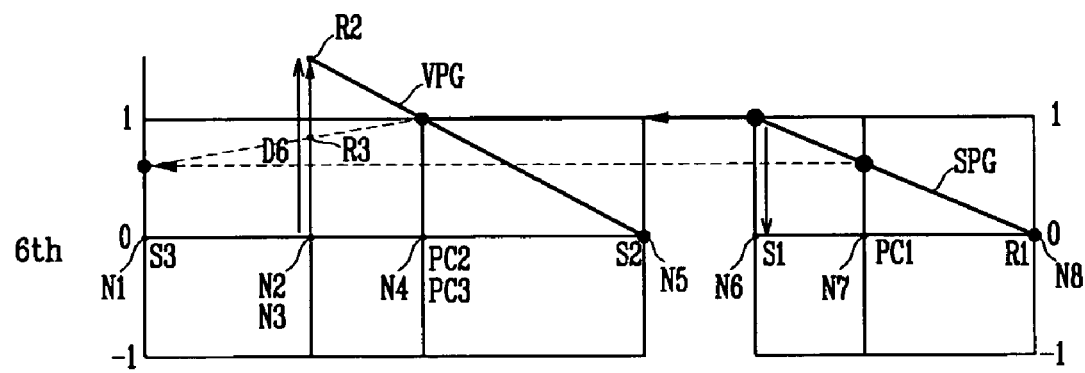
Figure 13:
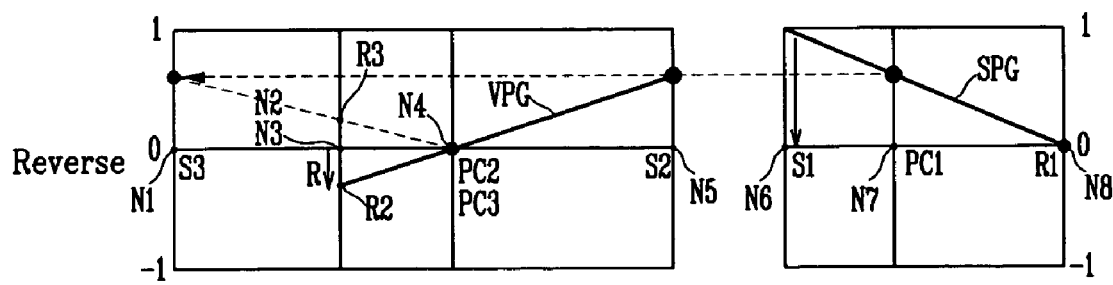

Therefore, speed diagram of the powertrain according to a fourth embodiment of the present invention is as shown in FIG. 12 and FIG. 13, wherein positions of the first sun gear S1 and the fist ring gear R1 are interchanged in comparison with FIG. 3 and FIG. 4. As shown in FIG. 12 and FIG. 13, shifting operation of the powertrain according to the present embodiment is effectively identical to that of a powertrain according to the first embodiment.

Hereinafter, a powertrain according to a fifth embodiment of the present invention is described in detail with reference to FIG. 14 to FIG. 16.

Figure 14:
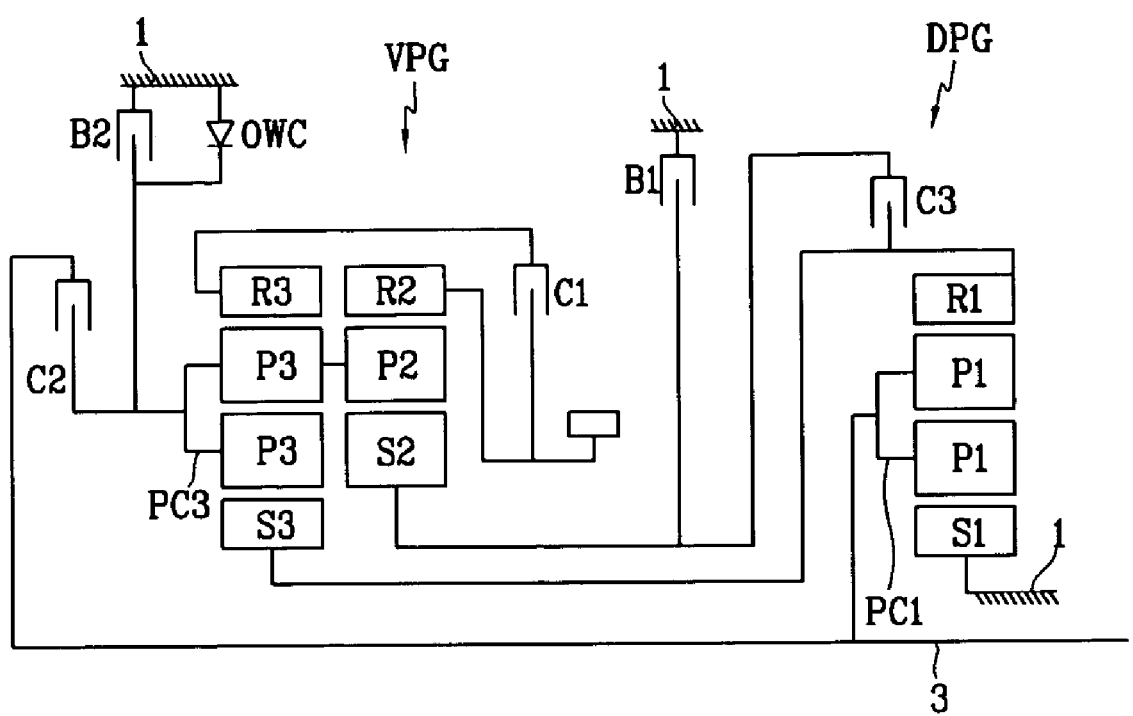
FIG. 14 to FIG. 16 are a schematic diagram, a speed diagram for first to third forward speeds, and a speed diagram for fourth to sixth forward speeds and reverse speed of a powertrain according to a fifth embodiment of the present invention, respectively.

FIG. 14 is a schematic diagram of a powertrain according to a fifth embodiment of the present invention.

A powertrain according to a fifth embodiment of the present invention includes a double pinion simple planetary gearset DPG (instead of the single pinion simple planetary gearset SPG) disposed to a front of an input shaft 3 connected to an output side of an engine via a torque converter. However; as same as the first embodiment, a powertrain according to the fifth embodiment further includes a variable compound planetary gearset VPG. The variable compound planetary gearset VPG includes a single pinion planetary gearset and a double pinion planetary gearset. The single pinion planetary gearset is disposed to a rear of the double pinion simple planetary gearset DPG, and the double pinion planetary gearset is disposed adjacent to the single pinion planetary gearset. One of the third planetary gears P3 is connected to the second planetary gear P2 such that they may be independently rotate.

The double pinion simple planetary gearset DPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, and a third planet carrier PC3 rotatably supporting both of a second planetary gear P2 engaged with the second sun gear S2 and the second ring gear R2 and a pair of third planetary gears P3 engaged with the third sun gear S3 and the third ring gear R3.

Regarding the arrangement of the planetary gearsets, the variable compound planetary gearset VPG is disposed rearward in the transmission, as same as a powertrain of the first embodiment, except that a double pinion simple planetary gearset DPG (instead of a single pinion simple planetary gearset) is disposed forward in a transmission.

In addition, as same as a powertrain of the first embodiment, the variable compound planetary gearset VPG forms five operational elements, and the double pinion simple planetary gearset DPG forms three operational elements.

In connection with operational elements, difference from the first embodiment comes from the usage of double pinion simple planetary gearset DPG instead of a single pinion one.

According to the present embodiment, in comparison with the first embodiment, the first planet carrier PC1 is used for the sixth operational element, the first ring gear R1 is used for the seventh operational element, and the first sun gear S1 is used for the eighth operational element.

That is, the first planet carrier PC1 (instead of the first ring gear R1 of the first embodiment) is variably connected to the third planet carrier PC3 of the fourth operational element via the second clutch C2 and forms the sixth operational element. In addition, the first ring gear R1 (instead of the first planet carrier PC1 of the first embodiment) is fixedly connected to the third sun gear S3 of the first operational element and is variably connected to the second sun gear S2 of the fifth operational element via the third clutch C3. The first planet carrier PC1 of the sixth operational element is fixedly connected to the input shaft 3 so as to always act as an input element.

As same as the first embodiment, the first clutch C1 variably connecting the second and third ring gears R2 and R3 is positioned between the variable compound planetary gearset VPG and the double pinion simple planetary gearset DPG.

Input routes for delivering the torque of the input shaft 3 to the variable compound planetary gearset VPG is similar to the first embodiment. The difference lies in that, the variable compound planetary gearset VPG receives the input torque by the operation of the first planet carrier PC1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first planet carrier PC1 of the sixth operational element.

The same operational chart shown in FIG. 2 may be applied to the present embodiment.

Figure 15:
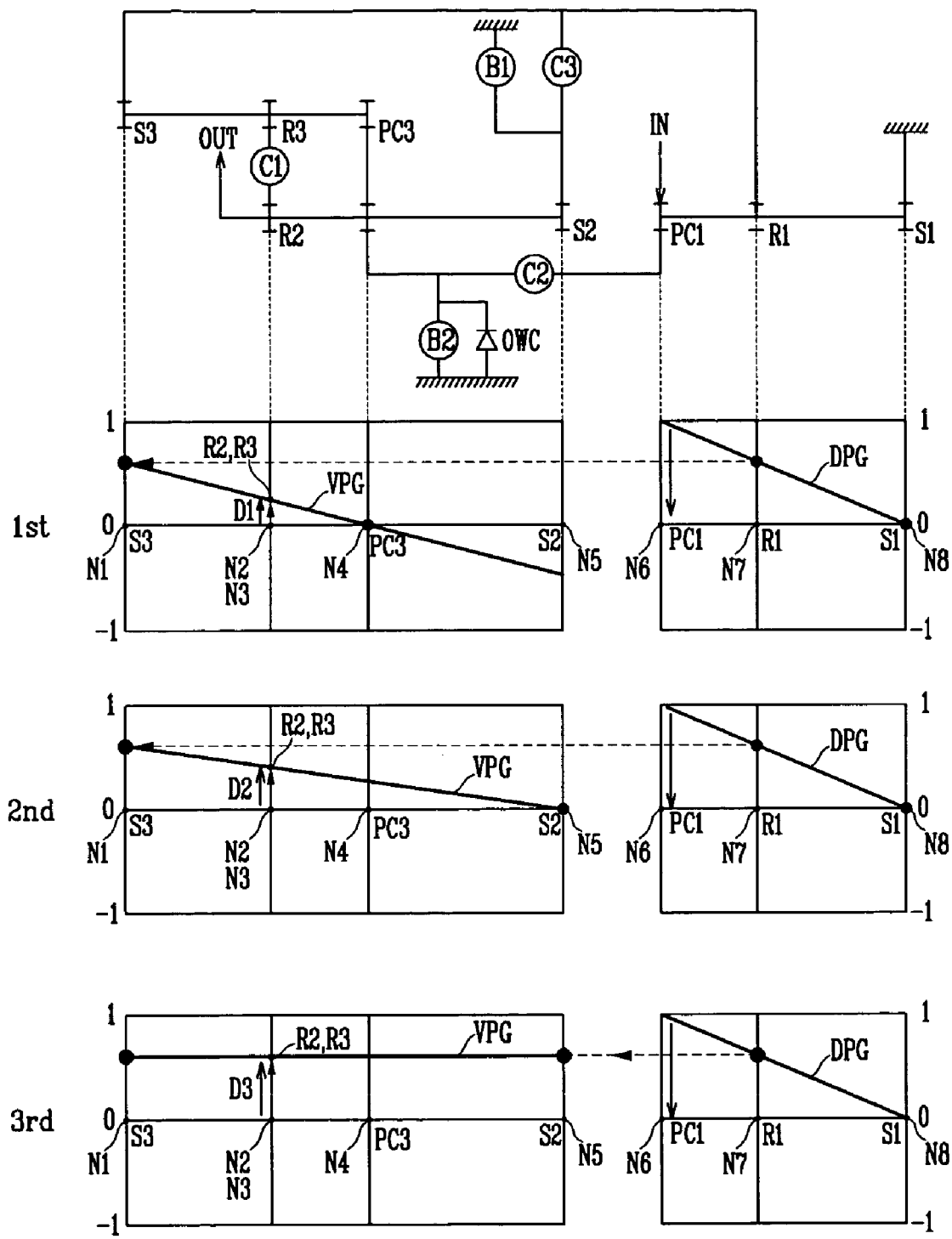
Figure 16:
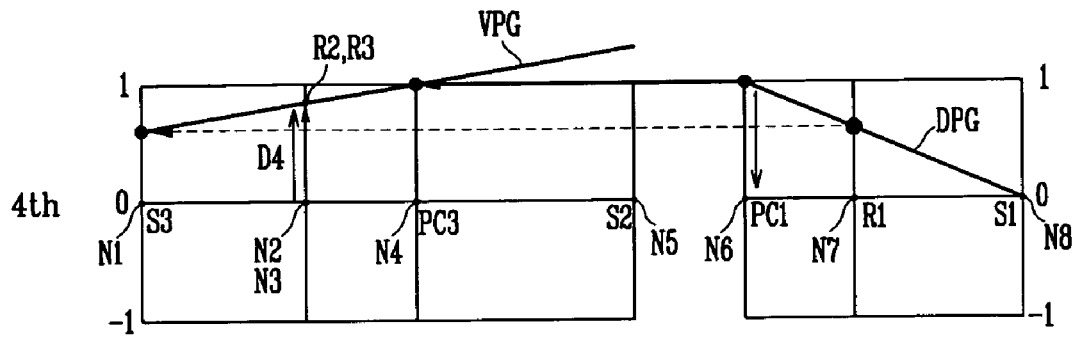
Figure 16:
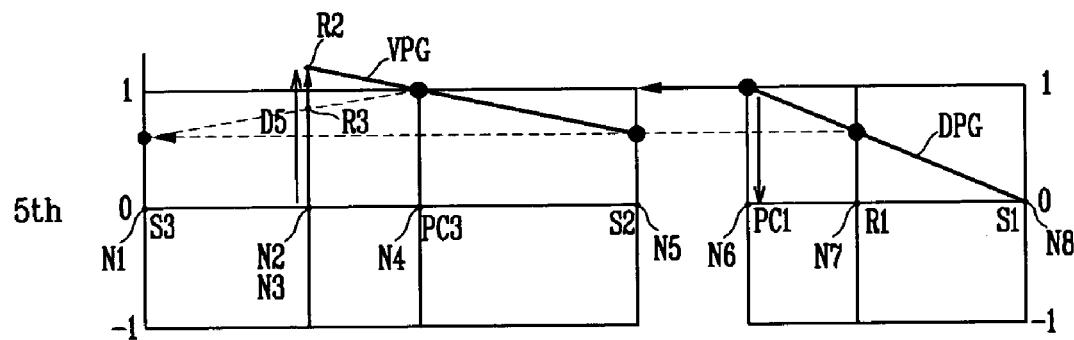
Figure 16:
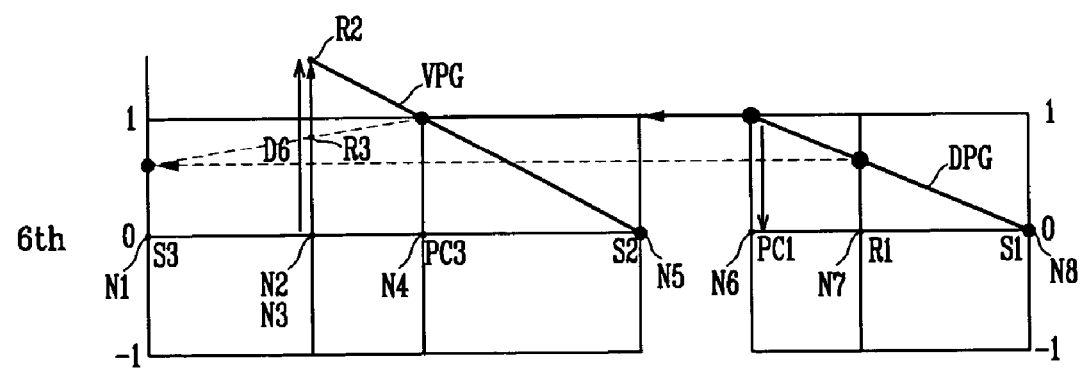
Figure 16:
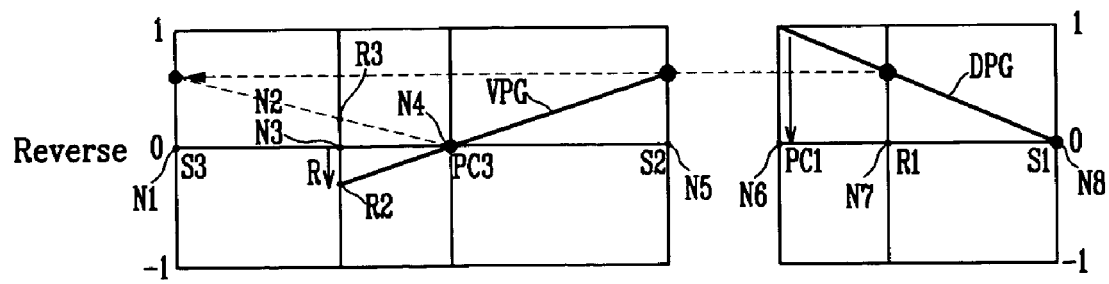

Therefore, speed diagram of the powertrain according to a fifth embodiment of the present invention is as shown in FIG. 15 and FIG. 16, wherein positions of the first planet carrier PC1 and the fist ring gear R1 are interchanged in comparison with FIG. 3 and FIG. 4. As shown in FIG. 15 and FIG. 16, shifting operation of the powertrain according to the present embodiment is effectively identical to that of a powertrain according to the first embodiment.

Hereinafter, a powertrain according to a sixth embodiment of the present invention is described in detail with reference to FIG. 17 to FIG. 19.

Figure 17:
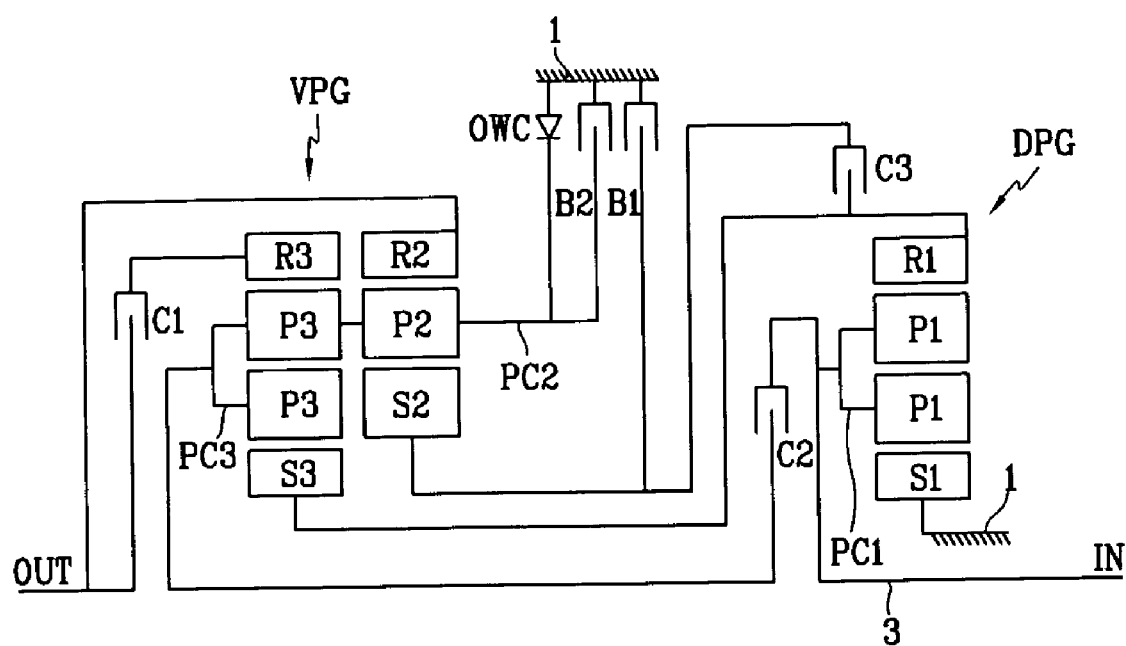
FIG. 17 to FIG. 19 are a schematic diagram, a speed diagram for first to third forward speeds, and a speed diagram for fourth to sixth forward speeds and reverse speed of a powertrain according to a sixth embodiment of the present invention, respectively.

FIG. 17 is a schematic diagram of a powertrain according to a sixth embodiment of the present invention.

A powertrain according to a sixth embodiment of the present invention includes a double pinion simple planetary gearset DPG (instead of the single pinion simple planetary gearset SPG) disposed to a front of an input shaft 3 connected to an output side of an engine via a torque converter. However, as same as the first embodiment, a powertrain according to the sixth embodiment further includes a variable compound planetary gearset VPG. The variable compound planetary gearset VPG includes a single pinion planetary gearset and a double pinion planetary gearset. The single pinion planetary gearset is disposed to a rear of the double pinion simple planetary gearset DPG, and the double pinion planetary gearset is disposed adjacent to the single pinion planetary gearset. One of the third planetary gears P3 is connected to the second planetary gear P2 such that they may be independently rotate.

The double pinion simple planetary gearset DPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, a second planet carrier PC2 rotatably supporting a second planetary gear P2 engaged with the second sun gear S2 and the second ring gear R2, and a third planet carrier PC3 rotatably supporting a pair of third planetary gears P3 engaged with the third sun gear S3 and the third ring gear R3.

Regarding the arrangement of the planetary gearsets, the variable compound planetary gearset VPG is disposed rearward in the transmission, as same as a powertrain of the first embodiment, except that a double pinion simple planetary gearset DPG (instead of a single pinion simple planetary gearset) is disposed forward in a transmission.

In addition, as same as a powertrain of the first embodiment, the variable compound planetary gearset VPG forms five operational elements, and the double pinion simple planetary gearset DPG forms three operational elements.

In connection with operational elements, difference from the first embodiment comes from the usage of double pinion simple planetary gearset DPG instead of a single pinion one.

According to the present embodiment, in comparison with the first embodiment, the first planet carrier PC1 is used for the sixth operational element, the first ring gear R1 is used for the seventh operational element, and the first sun gear S1 is used for the eighth operational element.

That is, the first planet carrier PC1 (instead of the first ring gear R1 of the first embodiment) is variably connected to the third planet carrier PC3 of the fourth operational element via the second clutch C2 and forms the sixth operational element. In addition, the first ring gear R1 (instead of the first planet carrier PC1 of the first embodiment) is fixedly connected to the third sun gear S3 of the first operational element and is variably connected to the second sun gear S2 of the fifth operational element via the third clutch C3. The first planet carrier PC1 of the sixth operational element is fixedly connected to the input shaft 3 so as to always act as an input element.

Interconnection of such operational elements is basically similar to the first embodiment. However, according to the present embodiment, the first clutch C1 interconnecting the third ring gear R3 and the second ring gear R2 is disposed opposite of the input shaft 3 with respect to the variable compound planetary gearset VPG.

In the first embodiment, the third planet carrier PC3 is variably connected to the transmission case 1 via the second brake B2 and the one-way clutch OWC arranged in parallel.

However, in the present embodiment, the third planet carrier PC3 is variably connected merely to the first planet carrier PC1 via the second clutch C2, while the second brake B2 and the one-way clutch OWC is connected to a second planet carrier PC2 disposed opposite of the third planet carrier PC3. The second and third planet carriers PC2 and PC3 has the same function of carrying the second and third planetary gears P2 and P3, so they may be functionally regarded as a same fourth operational element.

Input routes for delivering the torque of the input shaft 3 to the variable compound planetary gearset VPG is similar to the first embodiment. The difference lies in that, the variable compound planetary gearset VPG receives the input torque by the operation of the first planet carrier PC1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first planet carrier PC1 of the sixth operational element.

The same operational chart shown in FIG. 2 may be applied to the present embodiment.

Figure 18:
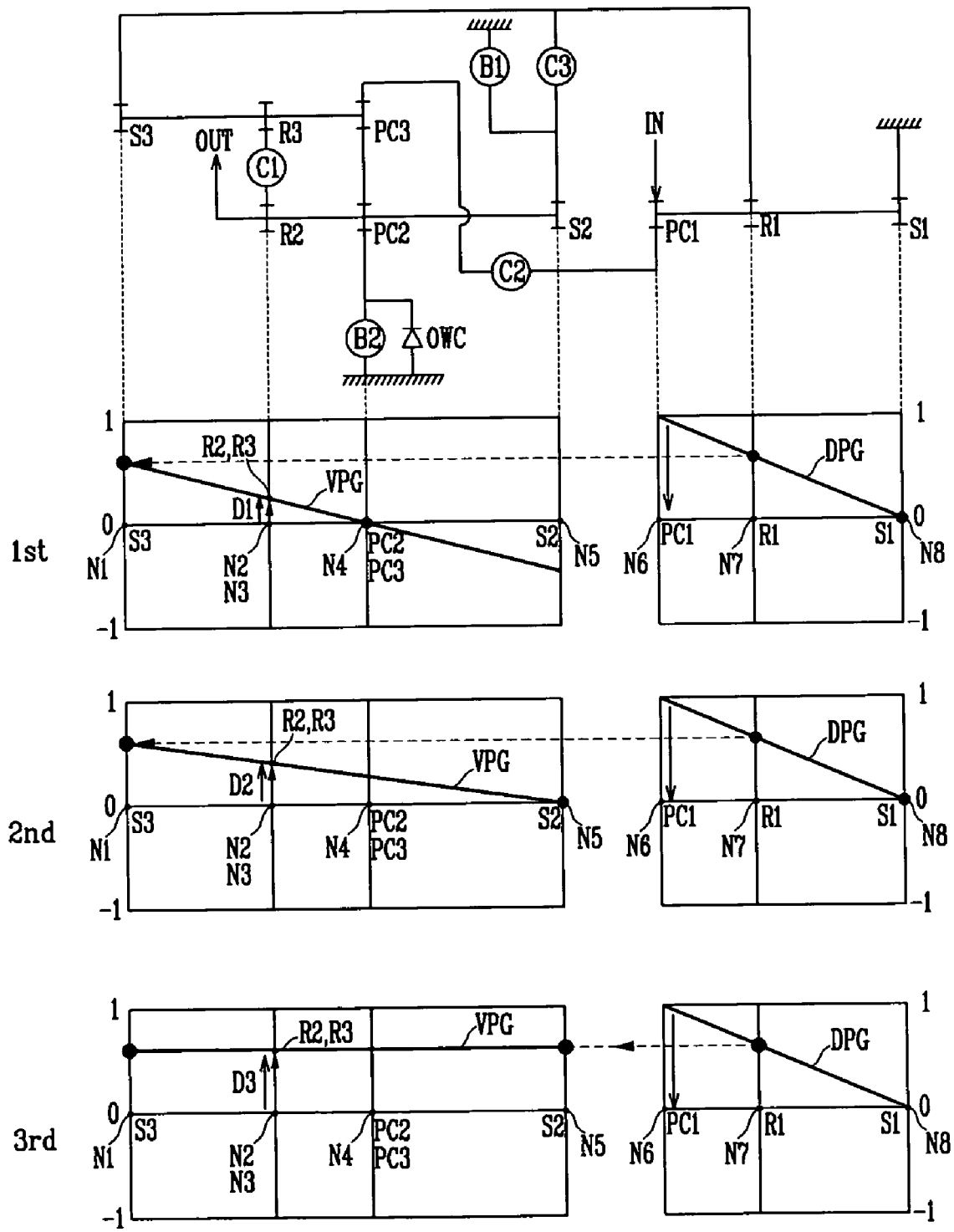
Figure 19:
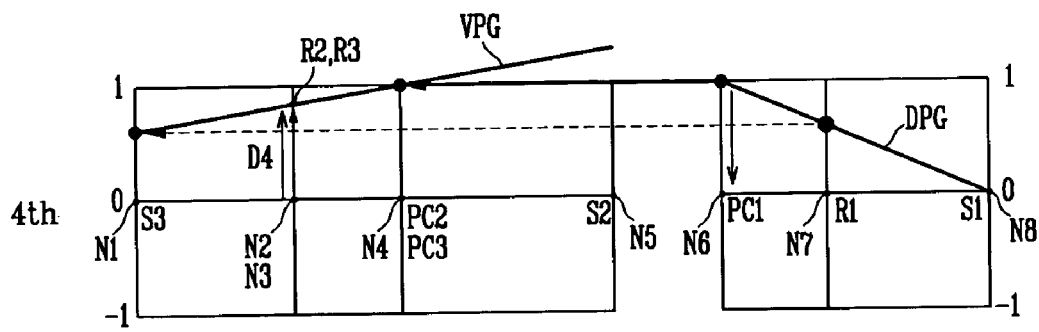
Figure 19:
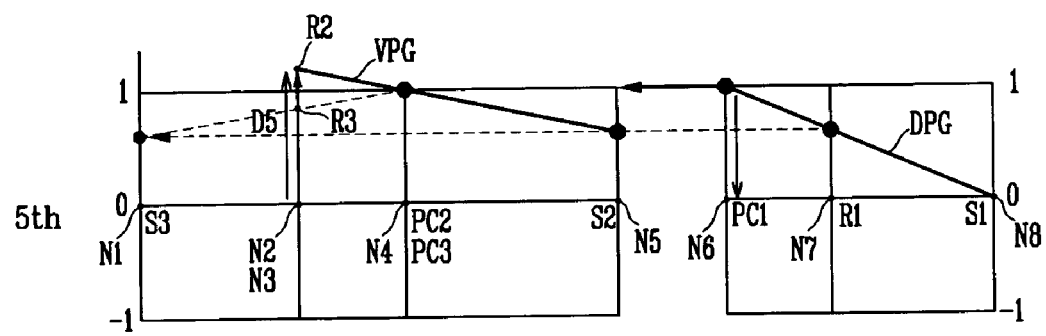
Figure 19:
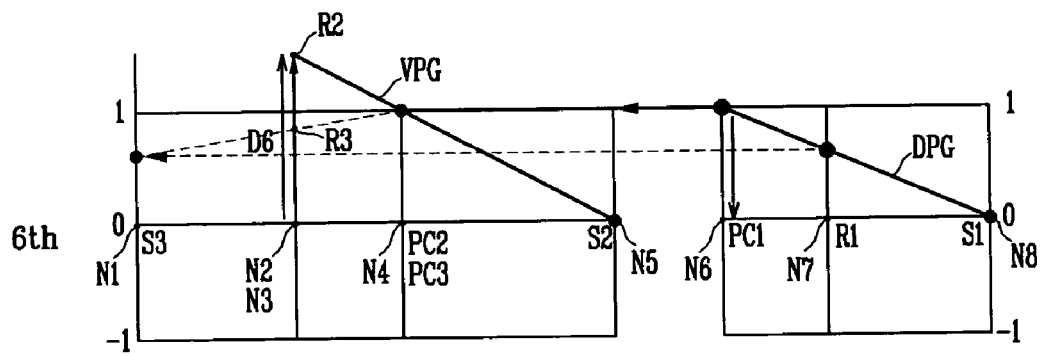
Figure 19:
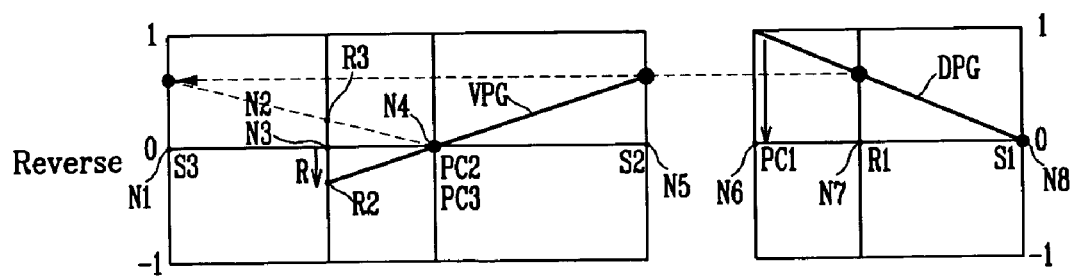

Therefore, speed diagram of the powertrain according to a sixth embodiment of the present invention is as shown in FIG. 18 and FIG. 19, wherein positions of the first planet carrier PC1 and the fist ring gear R1 are interchanged in comparison with FIG. 3 and FIG. 4. As shown in FIG. 18 and FIG. 19, shifting operation of the powertrain according to the present embodiment is effectively identical to that of a powertrain according to the first embodiment.

Hereinafter, a powertrain according to a seventh embodiment of the present invention is described in detail with reference to FIG. 20 to FIG. 22.

Figure 20:
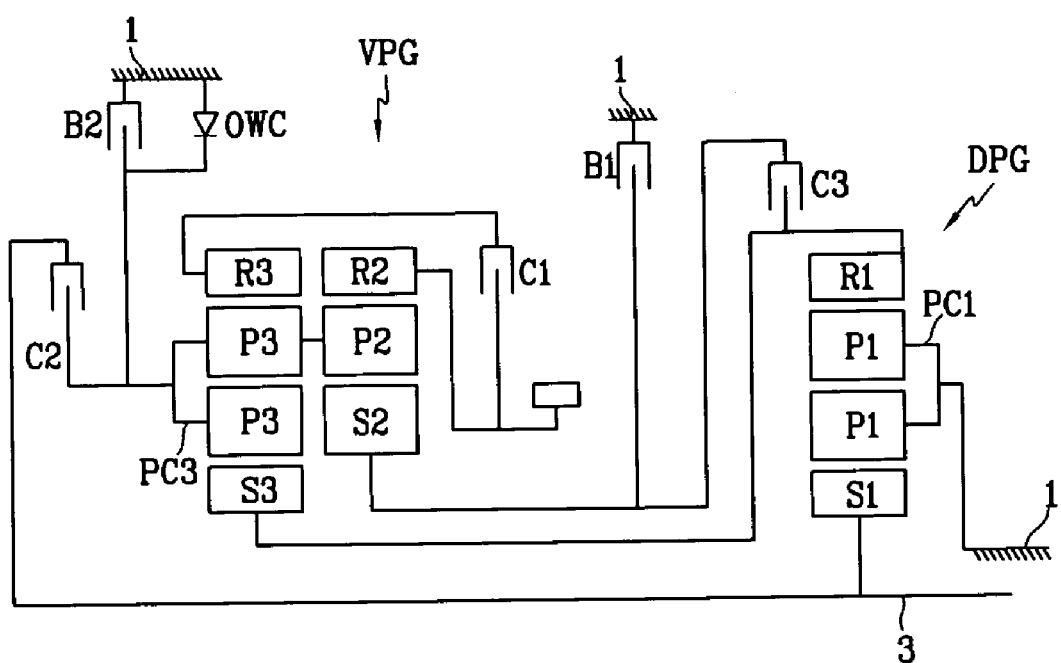
FIG. 20 to FIG. 22 are a schematic diagram, a speed diagram for first to third forward speeds, and a speed diagram for fourth to sixth forward speeds and reverse speed of a powertrain according to a seventh embodiment of the present invention, respectively.

FIG. 20 is a schematic diagram of a powertrain according to a seventh embodiment of the present invention.

A powertrain according to a seventh embodiment of the present invention includes a double pinion simple planetary gearset DPG (instead of the single pinion simple planetary gearset SPG) disposed to a front of an input shaft 3 connected to an output side of an engine via a torque converter. However, as same as the first embodiment, a powertrain according to the seventh embodiment further includes a variable compound planetary gearset VPG. The variable compound planetary gearset VPG includes a single pinion planetary gearset and a double pinion planetary gearset. The single pinion planetary gearset is disposed to a rear of the double pinion simple planetary gearset DPG, and the double pinion planetary gearset is disposed adjacent to the single pinion planetary gearset. One of the third planetary gears P3 is connected to the second planetary gear P2 such that they may be independently rotate.

The double pinion simple planetary gearset DPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, and a third planet carrier PC3 rotatably supporting both of a second planetary gear P2 engaged with the second sun gear S2 and the second ring gear R2 and a pair of third planetary gears P3 engaged with the third sun gear S3 and the third ring gear R3.

Regarding the arrangement of the planetary gearsets, the variable compound planetary gearset VPG is disposed rearward in the transmission, as same as a powertrain of the first embodiment, except that a double pinion simple planetary gearset DPG (instead of a single pinion simple planetary gearset) is disposed forward in a transmission.

In addition, as same as a powertrain of the first embodiment, the variable compound planetary gearset VPG forms five operational elements, and the double pinion simple planetary gearset DPG forms three operational elements.

In connection with operational elements, difference from the first embodiment comes from the usage of double pinion simple planetary gearset DPG instead of a single pinion one.

According to the present embodiment, in comparison with the first embodiment, the first sun gear S1 is used for the sixth operational element, the first ring gear R1 is used for the seventh operational element, and the first planet carrier PC1 is used for the eighth operational element.

That is, the first sun gear S1 (instead of the first ring gear R1 of the first embodiment) is variably connected to the third planet carrier PC3 of the fourth operational element via the second clutch C2 and forms the sixth operational element. In addition, the first ring gear R1 (instead of the first planet carrier PC1 of the first embodiment) is fixedly connected to the third sun gear S3 of the first operational element and is variably connected to the second sun gear S2 of the fifth operational element via the third clutch C3. The first sun gear S1 of the sixth operational element is fixedly connected to the input shaft 3 so as to always act as an input element.

As same as the first embodiment, the first clutch C1 variably connecting the second and third ring gears R2 and R3 is positioned between the variable compound planetary gearset VPG and the double pinion simple planetary gearset DPG.

Input routes for delivering the torque of the input shaft 3 to the variable compound planetary gearset VPG is similar to the first embodiment. The difference lies in that, the variable compound planetary gearset VPG receives the input torque by the operation of the first sun gear S1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first sun gear S1 of the sixth operational element.

The same operational chart shown in FIG. 2 may be applied to the present embodiment.

Figure 21:
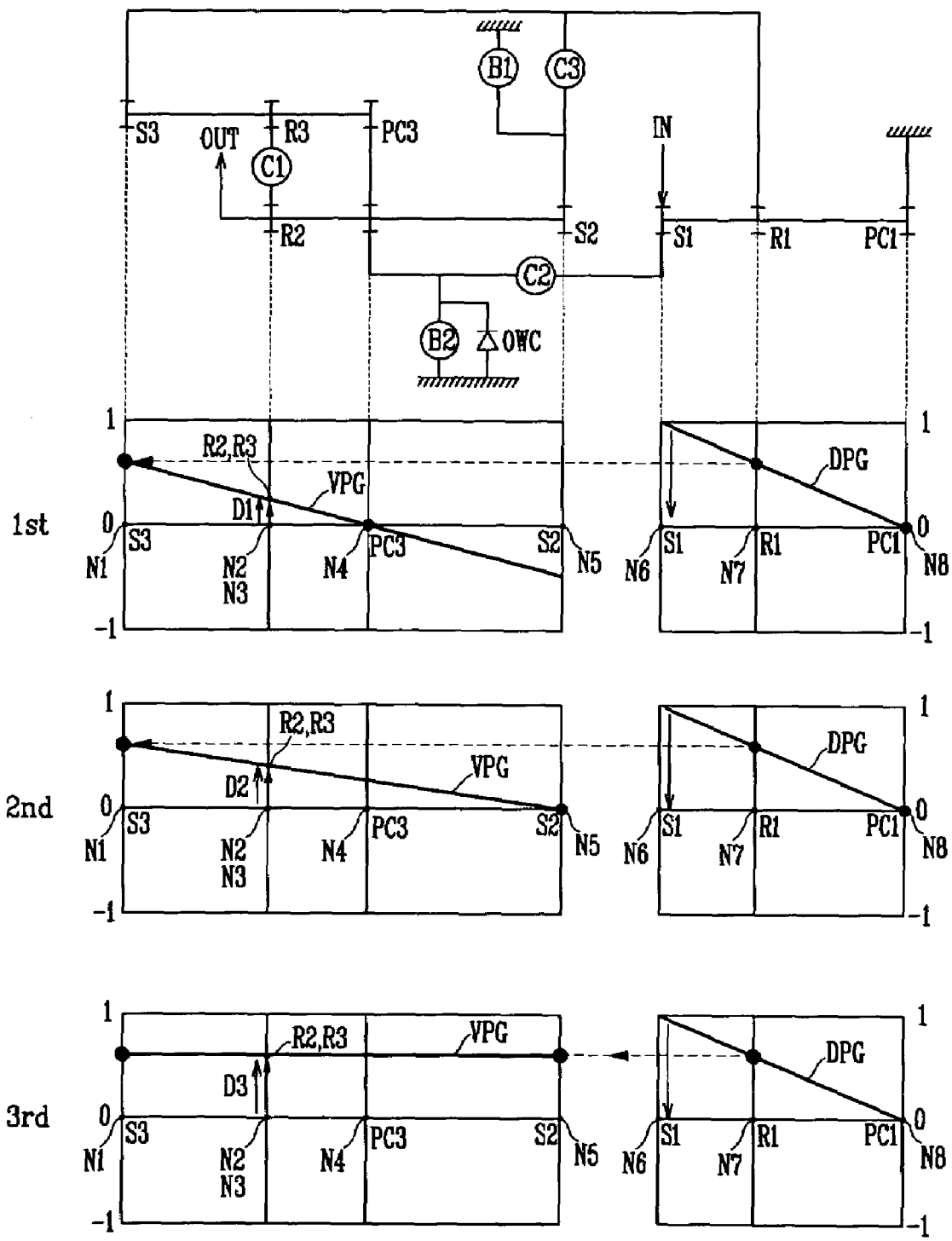
Figure 22:
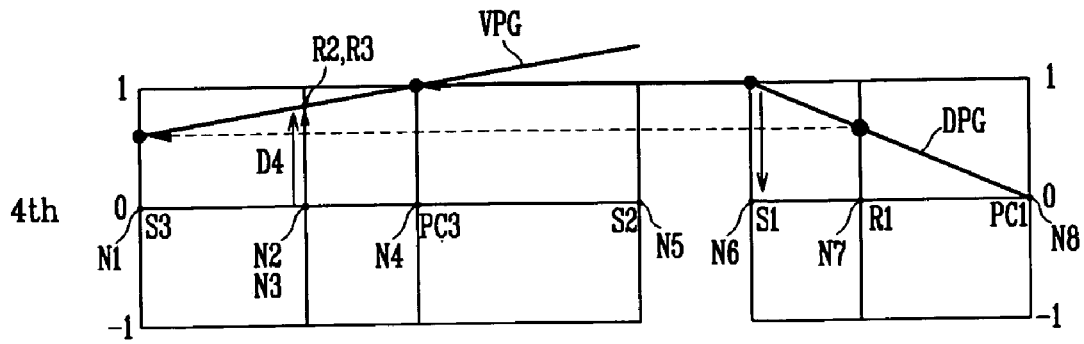
Figure 22:
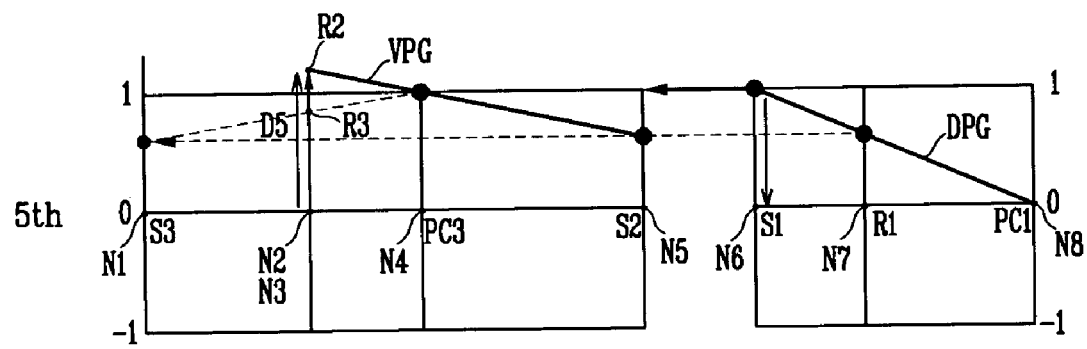
Figure 22:
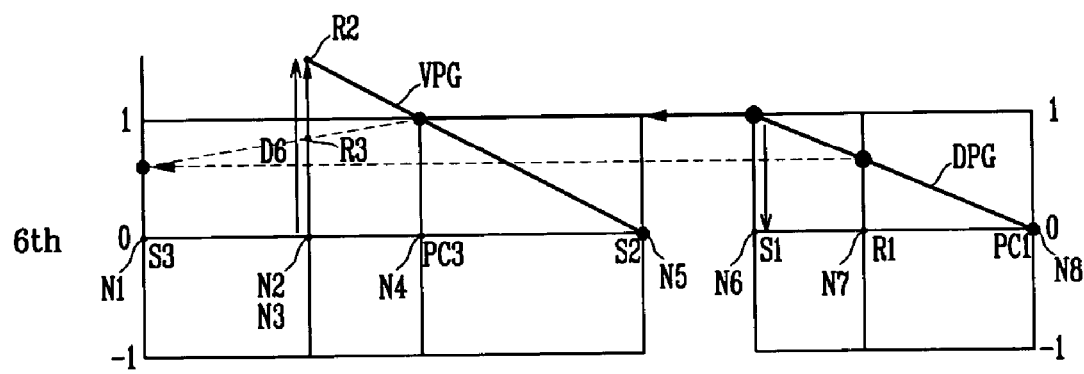
Figure 22:
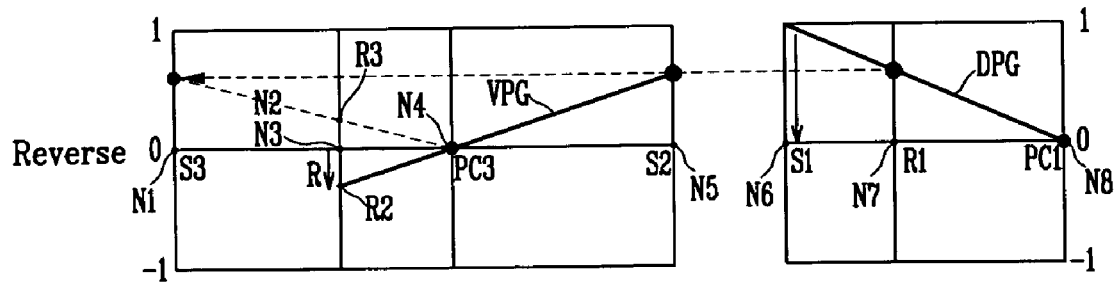

Therefore, speed diagram of the powertrain according to a seventh embodiment of the present invention is as shown in FIG. 21 and FIG. 22, wherein positions of the first ring gear R1, the first planet carrier PC1, and the fist ring gear R1 are interchanged in comparison with FIG. 3 and FIG. 4. As shown in FIG. 21 and FIG. 22, shifting operation of the powertrain according to the present embodiment is effectively identical to that of a powertrain according to the first embodiment.

Hereinafter, a powertrain according to an eighth embodiment of the present invention is described in detail with reference to FIG. 23 to FIG. 25.

Figure 23:
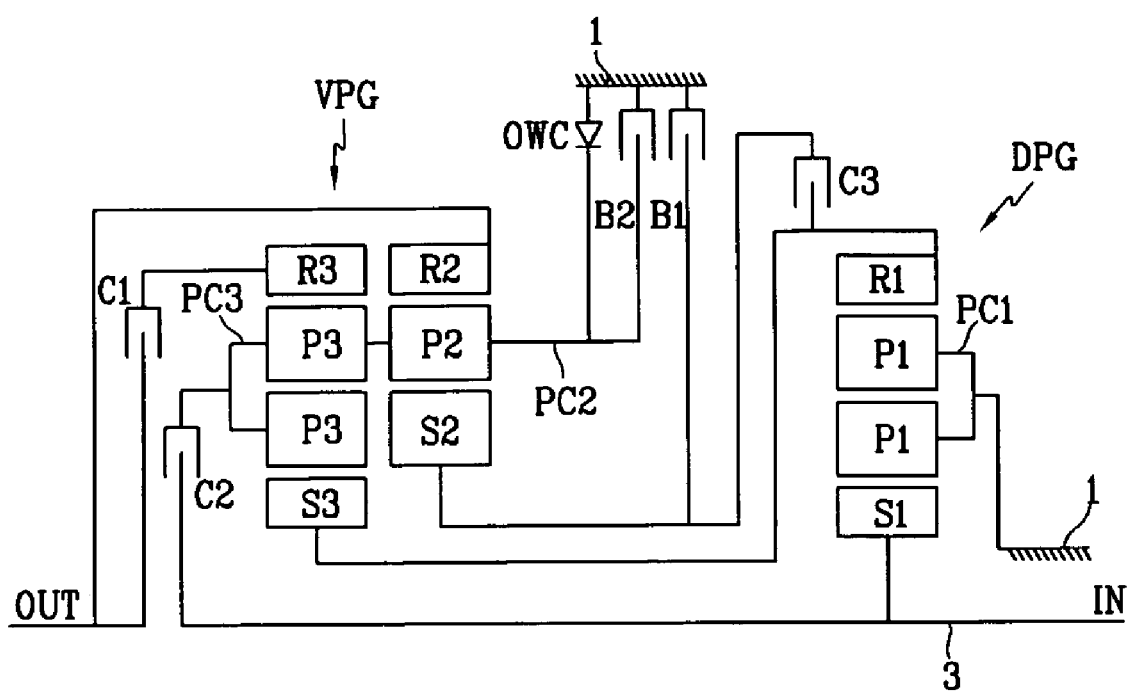
FIG. 23 to FIG. 25 are a schematic diagram, a speed diagram for first to third forward speeds, and a speed diagram for fourth to sixth forward speeds and reverse speed of a powertrain according to an eighth embodiment of the present invention, respectively.

FIG. 23 is a schematic diagram of a powertrain according to an eighth embodiment of the present invention.

A powertrain according to an eighth embodiment of the present invention includes a double pinion simple planetary gearset DPG (instead of the single pinion simple planetary gearset SPG) disposed to a front of an input shaft 3 connected to an output side of an engine via a torque converter. However, as same as the first embodiment, a powertrain according to the eighth embodiment further includes a variable compound planetary gearset VPG. The variable compound planetary gearset VPG includes a single pinion planetary gearset and a double pinion planetary gearset. The single pinion planetary gearset is disposed to a rear of the double pinion simple planetary gearset DPG, and the double pinion planetary gearset is disposed adjacent to the single pinion planetary gearset. One of the third planetary gears P3 is connected to the second planetary gear P2 such that they may be independently rotate.

The double pinion simple planetary gearset DPG includes, as its operational elements, a first sun gear S1, a first ring gear R1, and a first planet carrier PC1 rotatably supporting a first planetary gear P1 engaged with the first sun gear S1 and the first ring gear R1.

The variable compound planetary gearset VPG includes, as its operational elements, second and third sun gears S2 and S3, second and third ring gears R2 and R3, a second planet carrier PC2 rotatably supporting a second planetary gear P2 engaged with the second sun gear S2 and the second ring gear R2, and a third planet carrier PC3 rotatably supporting a pair of third planetary gears P3 engaged with the third sun gear S3 and the third ring gear R3.

Regarding the arrangement of the planetary gearsets, the variable compound planetary gearset VPG is disposed rearward in the transmission, as same as a powertrain of the first embodiment, except that a double pinion simple planetary gearset DPG (instead of a single pinion simple planetary gearset) is disposed forward in a transmission.

In addition, as same as a powertrain of the first embodiment, the variable compound planetary gearset VPG forms five operational elements, and the double pinion simple planetary gearset DPG forms three operational elements.

In connection with operational elements, difference from the first embodiment comes from the usage of double pinion simple planetary gearset DPG instead of a single pinion one.

According to the present embodiment, in comparison with the first embodiment, the first sun gear S1 is used for the sixth operational element, the first ring gear R1 is used for the seventh operational element, and the first planet carrier PC1 is used for the eighth operational element.

That is, the first sun gear S1 (instead of the first ring gear R1 of the first embodiment) is variably connected to the third planet carrier PC3 of the fourth operational element via the second clutch C2 and forms the sixth operational element. In addition, the first ring gear R1 (instead of the first planet carrier PC1 of the first embodiment) is fixedly connected to the third sun gear S3 of the first operational element and is variably connected to the second sun gear S2 of the fifth operational element via the third clutch C3. The first planet carrier PC1 is fixedly connected to the transmission case 1 so as to always act as a fixed element. The first sun gear S1 of the sixth operational element is fixedly connected to the input shaft 3 so as to always act as an input element.

Interconnection of such operational elements is basically similar to the first embodiment. However, according to the present embodiment, the first clutch C1 interconnecting the third ring gear R3 and the second ring gear R2 is disposed opposite of the input shaft 3 with respect to the variable compound planetary gearset VPG.

In the first embodiment, the third planet carrier PC3 is variably connected to the transmission case 1 via the second brake B2 and the one-way clutch OWC arranged in parallel.

However, in the present embodiment, the third planet carrier PC3 is variably connected merely to the first sun gear S1 via the second clutch C2, while the second brake B2 and the one-way clutch OWC is connected to a second planet carrier PC2 disposed opposite of the third planet carrier PC3. The second and third planet carriers PC2 and PC3 has the same function of carrying the second and third planetary gears P2 and P3, so they may be functionally regarded as a same fourth operational element.

Input routes for delivering the torque of the input shaft 3 to the variable compound planetary gearset VPG is similar to the first embodiment. The difference lies in that, the variable compound planetary gearset VPG receives the input torque by the operation of the first sun gear S1 in the present embodiment instead of the first ring gear R1 of the first embodiment.

That is, the second input route is enabled at fourth, fifth, and sixth forward speeds, by an operation of the second clutch C2 that variably interconnects the third planet carrier PC3 of the fourth operational element and the first sun gear S1 of the sixth operational element.

The same operational chart shown in FIG. 2 may be applied to the present embodiment.

Figure 24:
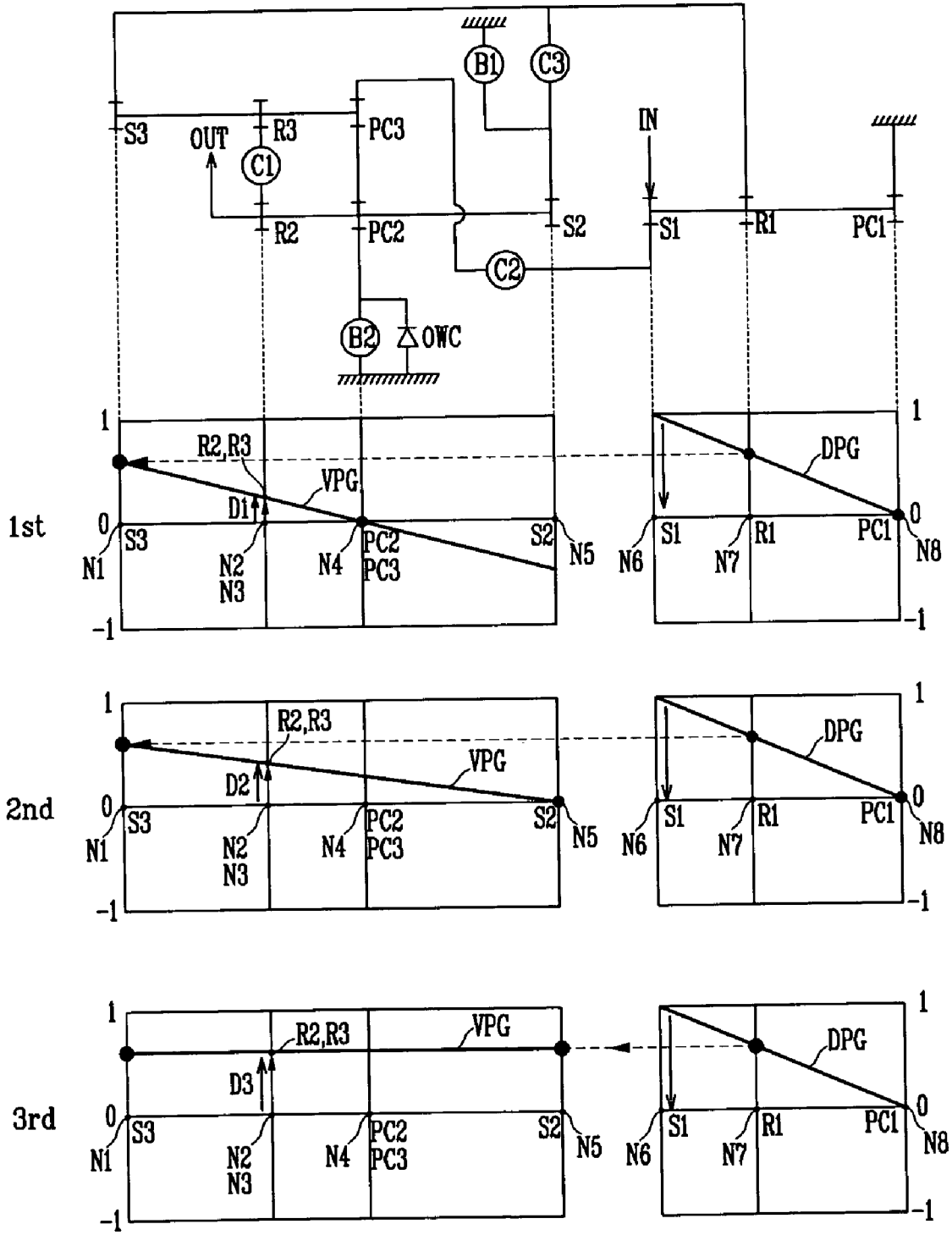
Figure 25:
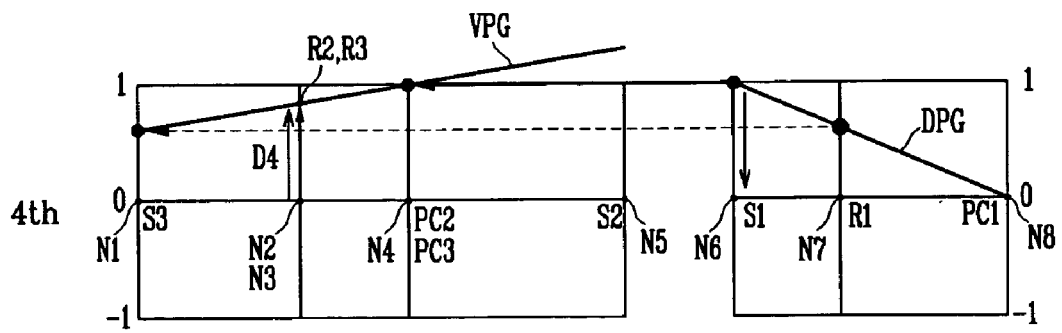
Figure 25:
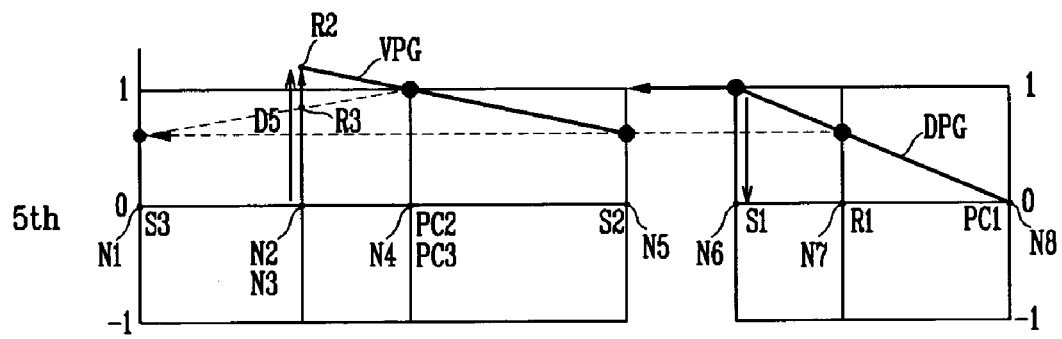
Figure 25:
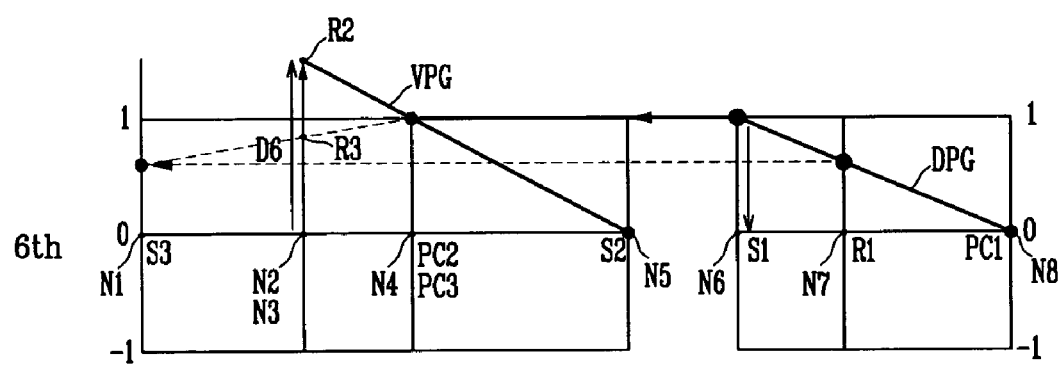
Figure 25:
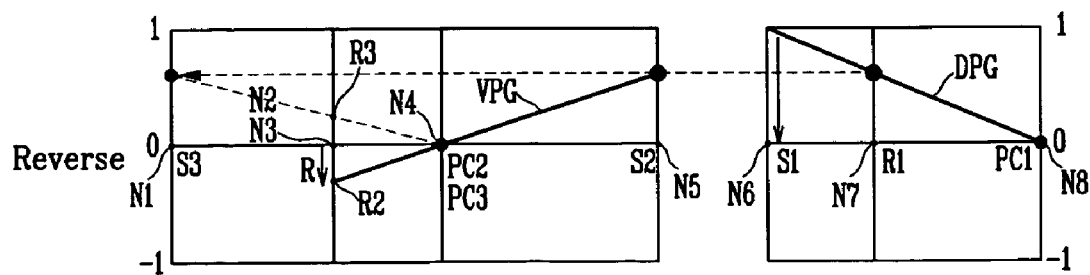
Figures 26, 27:
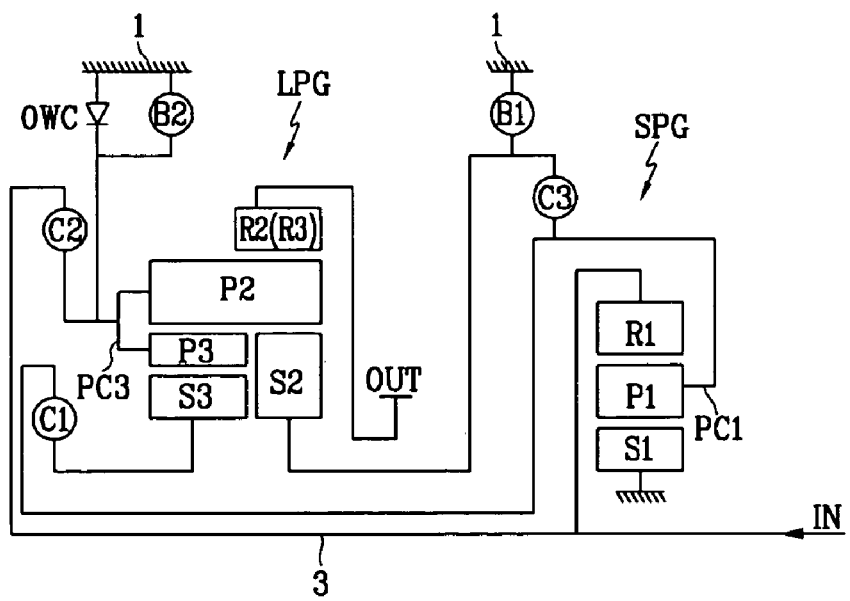
FIG. 26 is a schematic diagram of a conventional powertrain.
FIG. 27 is an operational chart for a powertrain of FIG. 26.
Figure 28:
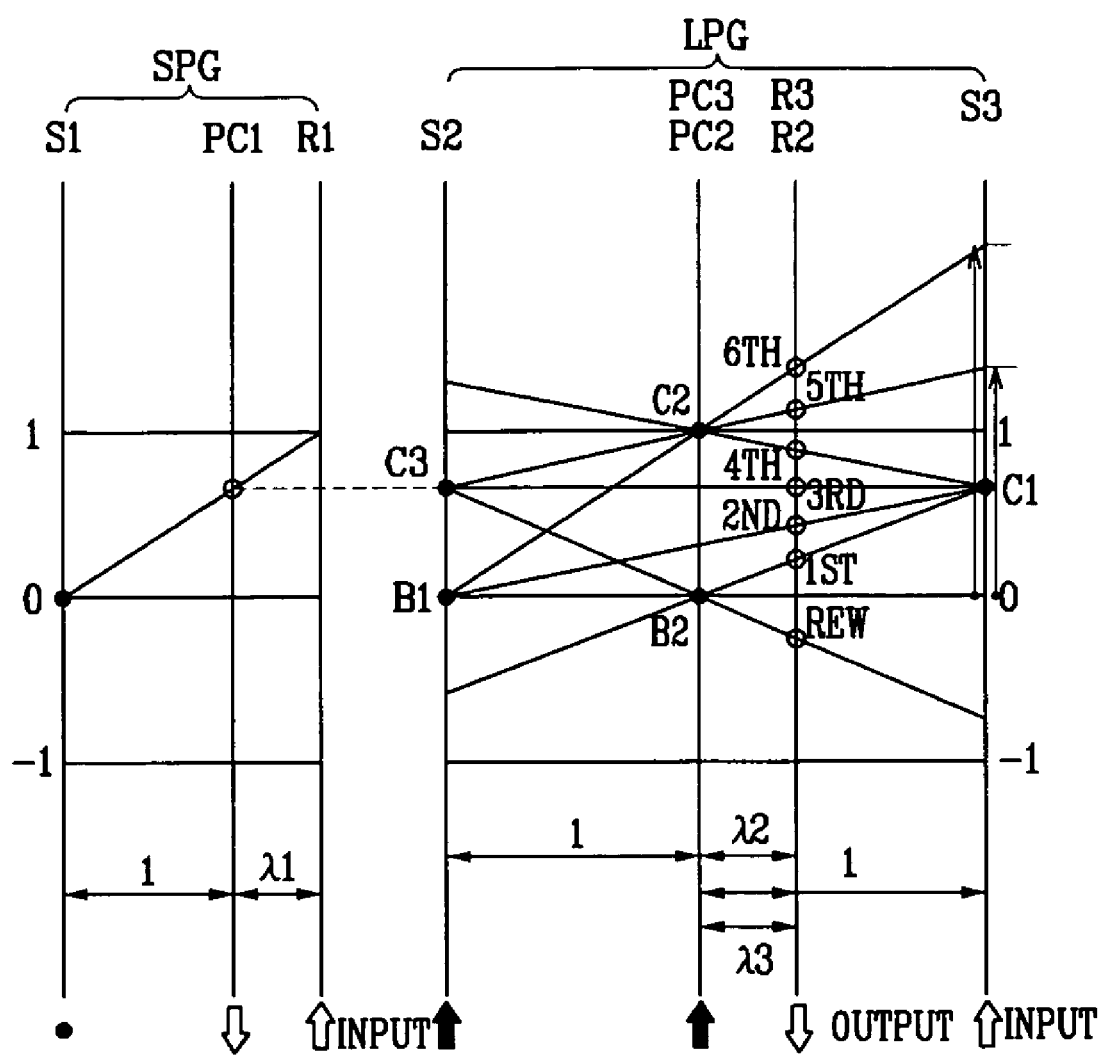
FIG. 28 is a speed diagram for first to sixth forward speeds and reverse speed of a conventional powertrain.

Therefore, speed diagram of the powertrain according to a sixth embodiment of the present invention is as shown in FIG. 24 and FIG. 25, wherein positions of the first sun gear S1, the first planet carrier PC1, and the fist ring gear R1 are interchanged in comparison with FIG. 3 and FIG. 4. As shown in FIG. 24 and FIG. 25, shifting operation of the powertrain according to the present embodiment is effectively identical to that of a powertrain according to the first embodiment.

As described above, according to an embodiment of the present invention, single and double pinion planetary gearsets of a compound planetary gearset shares a planet carrier such that planetary gears thereof may independently rotate. The compound planetary gearset receives a toque from a simple planetary gearset through two input routes of fixed or variable connection thereto, and also receives a torque from an input shaft through an input route through variable connection thereto. Therefore, rotation speed of an idly rotating element may be minimized such that power transmission efficiency and durability may be enhanced.

The single and double pinion planetary gearsets of the variable compound planetary gearset shares only the planet carrier, allowing the planetary gears to independently rotate. Therefore, at high speed such as fifth and sixth forward speeds and at the reverse speed, an idling speed of a sun gear may be minimized.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission, comprising:
a variable compound planetary gearset including a double pinion planetary gearset and a single pinion planetary gearset interconnected by a shared planet carrier so as to form first, second, third, fourth, and fifth operational elements; and
a simple planetary gearset having sixth, seventh, and eighth operational element including an operational element fixedly and variably connected to two operational element of the variable compound planetary gearset, an input element fixedly connected to an input shaft, and a fixed element fixedly connected to a transmission case.

2. The powertrain of claim 1, wherein:
the first operational element is a sun gear of the double pinion planetary gearset of the variable compound planetary gearset;
the second operational element is a ring gear of the double pinion planetary gearset of the variable compound planetary gearset;
the third operational element is a ring gear of the single pinion planetary gearset of the variable compound planetary gearset;
the fourth operational element is the shared planet carrier;
the fifth operational element is a sun gear of the single pinion planetary gearset of the variable compound planetary gearset;
the sixth operational element is a ring gear of the simple planetary gearset;
the seventh operational element is a planet carrier of the simple planetary gearset; and
the eighth operational element is a sun gear of the simple planetary gearset,
wherein:
the first operational element is fixedly connected to the seventh operational element;
the second operational element is variably connected to the third operational element via a first clutch;
the fourth operational element is variably connected to the sixth operational element via a second clutch;
the fifth operational element is variably connected to the seventh operational element via a third clutch;
the fifth operational element is variably connected to the transmission case via a first brake;
the fourth operational element is variably connected to the transmission case via at least one of a second brake and a one-way clutch;
the eighth operational element is fixedly connected to the transmission case;
the third operational element always acts as an output element; and
the sixth operational element always acts as an input element.

3. The powertrain of claim 2, wherein the simple planetary gearset is a single pinion planetary gearset.

4. The powertrain of claim 2, wherein torque of the input shaft is delivered to the variable compound planetary gearset through input routes comprising:
a first input route wherein the torque of the input shaft is delivered to the first operational element at a reduced speed through the sixth operational element and the seventh operational element;
a second, input route wherein the torque of the input shaft is delivered to the fourth operational element at an equal speed; and
a third input route wherein the torque of the input shaft is delivered to the fifth operational element at a reduced speed through the sixth operational element and seventh operational element.

5. The powertrain of claim 4, wherein the first input route is activated at first, second, third, and fourth forward speeds by an operation of the first clutch variably connecting the second and third operational elements.

6. The powertrain of claim 4, wherein the second input route is activated at fourth, fifth, and sixth forward speeds by an operation of the second clutch variably connecting the fourth and sixth operational elements.

7. The powertrain of claim 4, wherein the third input route is activated at third and fifth forward speeds and a reverse speed by an operation of the third clutch variably connecting the fifth and seventh operational elements.

8. The powertrain of claim 2, wherein:
the first clutch and the one-way clutch operate at first forward speed;
for a second forward speed, the first brake operates from the first forward speed;

for a third forward speed, the first brake is released and the third clutch operates from the second forward speed;

for a fourth forward speed, the third clutch is released and the second clutch operates from the third forward speed;

for a fifth forward speed, the first clutch is released and the third clutch operates from the fourth forward speed;

for a sixth forward speed, the third clutch is released and the first brake operates from the fifth forward speed; and the third clutch and the second brake operate at a reverse speed.

9. The powertrain of claim 2, wherein the first clutch is positioned between the variable compound planetary gearset and the simple planetary gearset.

10. The powertrain of claim 2, wherein the first clutch is positioned opposite of the input shaft with respect to the variable compound planetary gearset.

11. A six-speed powertrain of an automatic transmission, comprising:
   a variable compound planetary gearset including a single pinion planetary gearset and a double pinion planetary gearset interconnected by a shared planet carrier so as to form five operational elements, wherein the shared planet carrier is variably connected to a transmission case via at least one of a second brake and a one-way clutch and also variably connected to an input shaft via a second clutch, ring gears thereof are variably interconnected via a first clutch, one of the ring gears always acts as an output element, and a sun gear of the single pinion planetary gearset is variably connected to the transmission case; and
   a simple planetary gearset forming three operational elements including a planet carrier fixedly connected to one sun gear of the variable compound planetary gearset and variably connected to another sun gear thereof.

12. The powertrain of claim 11, wherein the simple planetary gearset is a single pinion planetary gearset.

13. The powertrain of claim 11, wherein torque of the input shaft is delivered to the variable compound planetary gearset through input routes comprising:
   a first input route wherein the torque of the input shaft is delivered to a sun gear of the double pinion planetary gearset of the variable compound planetary gearset at a reduced speed through a ring gear and the planet carrier of the simple planetary gearset;
   a second input route wherein the torque of the input shaft is delivered to the shared planet carrier at an equal speed; and
   a third input route wherein the torque of the input shaft is delivered to a sun gear of the single pinion planetary gearset of the variable compound planetary gearset at a reduced speed through a ring gear and the planet carrier of the simple planetary gearset.

14. The powertrain of claim 13, wherein the first input route is activated at first, second, third, and fourth forward speeds by an operation of the first clutch variably connecting the ring gears of the variable compound planetary gearset.

15. The powertrain of claim 13, wherein the second input route is activated at fourth, fifth, and sixth forward speeds by an operation of the second clutch variably connecting the shared planet carrier of the variable compound planetary gearset and the ring gear of the simple planetary gearset.

16. The powertrain of claim 13, wherein the third input route is activated at third and fifth forward speeds and a reverse speed by an operation of a third clutch variably connecting the sun gear of the single pinion planetary gearset of the variable compound planetary gearset and the planet carrier of the simple planetary gearset.

17. The powertrain of claim 11, wherein:
   the first clutch and the one-way clutch operate at first forward speed;
   for a second forward speed, the first brake operates from the first forward speed;
   for a third forward speed, the first brake is released and the third clutch operates from the second forward speed;
   for a fourth forward speed, the third clutch is released and the second clutch operates from the third forward speed;
   for a fifth forward speed, the first clutch is released and the third clutch operates from the fourth forward speed;
   for a sixth forward speed, the third clutch is released and the first brake operates from the fifth forward speed; and
   the third clutch and the second brake operate at a reverse speed.

18. The powertrain of claim 11, wherein the first clutch is positioned between the variable compound planetary gearset and the simple planetary gearset.

19. The powertrain of claim 11, wherein the first clutch is positioned opposite of the input shaft with respect to the variable compound planetary gearset.

* * * * *